(12) United States Patent
Akaike et al.

(10) Patent No.: US 9,575,919 B2
(45) Date of Patent: Feb. 21, 2017

(54) INFORMATION SYSTEM CAPABLE OF EXPANDING DRIVE AND BUS NUMBER ALLOCATION METHOD OF THE INFORMATION SYSTEM

(71) Applicant: HITACHI, LTD., Tokyo (JP)

(72) Inventors: Hirotoshi Akaike, Tokyo (JP); Katsuya Tanaka, Tokyo (JP); Makio Mizuno, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 231 days.

(21) Appl. No.: 14/373,911

(22) PCT Filed: Sep. 25, 2013

(86) PCT No.: PCT/JP2013/075867
§ 371 (c)(1),
(2) Date: Jul. 23, 2014

(87) PCT Pub. No.: WO2015/045030
PCT Pub. Date: Apr. 2, 2015

(65) Prior Publication Data
US 2016/0117281 A1 Apr. 28, 2016

(51) Int. Cl.
*G06F 13/40* (2006.01)
*G06F 13/36* (2006.01)
(Continued)

(52) U.S. Cl.
CPC .............. *G06F 13/4027* (2013.01); *G06F 3/06* (2013.01); *G06F 13/14* (2013.01); *G06F 13/362* (2013.01);
(Continued)

(58) Field of Classification Search
CPC ........ G06F 3/14; G06F 13/362; G06F 3/4022; G06F 3/4027; G06F 3/4282
See application file for complete search history.

(56) References Cited

U.S. PATENT DOCUMENTS

| 6,397,268 B1* | 5/2002 | Cepulis ................. G06F 9/4411 710/104 |
| 2004/0168004 A1* | 8/2004 | Mudusuru ........... G06F 13/4027 710/104 |

(Continued)

FOREIGN PATENT DOCUMENTS

| JP | 2009-140081 | 6/2009 |
| JP | 2010-205124 | 9/2010 |

(Continued)

*Primary Examiner* — Tim T Vo
*Assistant Examiner* — Phong H Dang
(74) *Attorney, Agent, or Firm* — Mattingly & Malur, PC

(57) ABSTRACT

In a storage device applying PCIe to a back-end network connection, in order to be capable of allocating bus numbers and making a PCIe switch expanded afterwards usable, it is necessary to once reset all PCIe switches. To dissolve this necessity, PCIe switches of the back-end network of the storage device are connected in series, a range of continuous bus numbers that are managed and stored in bus number management table is allocated for the back-end network connection, and when expanding the PCIe switch, the bus numbers are allocated in ascending order from a minimum value of the allocatable bus numbers to each of a link between the PCIe switches and to a virtual PCI bus within the PCIe switch, and the bus numbers are allocated in descending order from a maximum value of the allocatable bus numbers to the link between the PCIe switch and a drive.

12 Claims, 15 Drawing Sheets

(51) Int. Cl.
   *G06F 13/42* (2006.01)
   *G06F 3/06* (2006.01)
   *G06F 13/14* (2006.01)
   *G06F 13/362* (2006.01)

(52) U.S. Cl.
   CPC ....... *G06F 13/4022* (2013.01); *G06F 13/4282* (2013.01)

(56) References Cited

U.S. PATENT DOCUMENTS

2010/0036995 A1* 2/2010 Nakayama .......... G06F 13/4022
                                                      710/316
2010/0228887 A1 9/2010 Koike
2011/0029693 A1* 2/2011 Brinkmann ......... G06F 13/4081
                                                       710/8

FOREIGN PATENT DOCUMENTS

| JP | 2011-516964 A | 5/2011 |
| JP | 2011-107858   | 6/2011 |
| JP | 2012-174092   | 9/2012 |

* cited by examiner

PRIOR ART

FIG.10

| BUS NUMBER | ALLOCATION DESTINATION INFORMATION | |
|---|---|---|
| 10 | LINK BETWEEN ROOT PORT #1 AND 1ST STAGE PCIe SW | min |
| 11 | VIRTUAL PCI BUS OF 1ST STAGE PCIe SW | |
| 12 | LINK BETWEEN 1ST AND 2ND STAGE PCIe SW | |
| 13 | VIRTUAL PCI BUS OF 2ND STAGE PCIe SW | |
| 14 | LINK BETWEEN 2ND AND 3RD STAGE PCIe SW | |
| 15 | UNALLOCATED | |
| . | | |
| . | | |
| . | | |
| 225 | UNALLOCATED | |
| 226 | LINK OF DRIVE #1 OF PCIe SW 2ND STAGE | |
| . | | |
| . | | |
| 235 | LINK OF DRIVE #10 OF PCIe SW 2ND STAGE | |
| 236 | LINK OF DRIVE #1 OF PCIe SW 1ST STAGE | |
| . | | |
| . | | |
| 245 | LINK OF DRIVE #10 OF PCIe SW 1ST STAGE | max |

FIG.13

| BUS NUMBER | ALLOCATION DESTINATION INFORMATION |
|---|---|
| 10 | LINK BETWEEN ROOT PORT #1 AND 1ST STAGE PCIe SW |
| 11 | VIRTUAL PCI BUS OF 1ST STAGE PCIe SW |
| 12 | LINK BETWEEN 1ST AND 2ND STAGE PCIe SW |
| 13 | VIRTUAL PCI BUS OF 2ND STAGE PCIe SW |
| 14 | LINK BETWEEN 2ND AND 3RD STAGE PCIe SW |
| 15 | UNALLOCATED |
| . | |
| 218 | UNALLOCATED |
| 219 | LINK OF DRIVE #1 OF PCIe SW 2ND STAGE |
| . | |
| 228 | LINK OF DRIVE #10 OF PCIe SW 2ND STAGE |
| 229 | UNALLOCATED (RESERVED) |
| . | . |
| 233 | UNALLOCATED (RESERVED) |
| 234 | LINK BETWEEN 1ST STAGE PCIe SW AND EMBEDDED PCIe SW |
| 235 | VIRTUAL PCI BUS OF EMBEDDED PCIe SW |
| 236 | FLASH MEMORY CONTROLLER #1 |
| 237 | FLASH MEMORY CONTROLLER #2 |
| 238 | LINK OF DRIVE #6 OF PCIe SW 1ST STAGE |
| . | |
| 245 | LINK OF DRIVE #10 OF PCIe SW 1ST STAGE |

…

INFORMATION SYSTEM CAPABLE OF EXPANDING DRIVE AND BUS NUMBER ALLOCATION METHOD OF THE INFORMATION SYSTEM

TECHNICAL FIELD

The present invention relates to a storage device in which "PCI-Express" (hereinafter referred to as PCIe. "PCI-Express" is a registered trademark of PCI-SIG) is applied to a network connection of a back-end.

BACKGROUND ART

A storage device is generally configured to have random accessible non-volatile medium. The random accessible non-volatile medium is, for example, a magnetic disk drive, an optical disk drive and the like. Further, currently major storage device is configured to have a plurality of hard disk drives (HDD).

Further, accompanying a progress in semiconductor technology, a non-volatile semiconductor memory capable of being used as a memory medium of the storage device is being developed. As a drive using such non-volatile semiconductor memory as the memory medium, for example, a solid state drive (SSD) may be given. The storage device provided with the SSD is superior in duration life, electric power saving, and access time and the like, compared to the storage device provided with HDD only.

In the conventional storage device, a back-end interface and a plurality of the HDDs are, for example, connected by a Serial Attached SCSI (SAS) protocol. Further, an SSD provided with an SAS interface (SAS-SSD) is connected to the back-end interface.

Further, recently, a PCIe-connected SSD capable of performing faster data transfer is starting to appear.

In order to join the plurality of the PCIe-connected SSDs to the storage device, there is a form of connecting the PCIe-connected SSDs using a PCIe switch.

Since there is a limit to the number of PCIe-connected SSDs that could be joined with one PCIe switch, a large-scale system may adopt a configuration of connecting a number of PCIe switches in multiple stages.

In order to use the PCIe switches connected in multiple stages, and the PCIe-connected SSDs joined to the PCIe switches, an initialization of PCIe is necessary. An allocation of bus numbers is one of the initialization. The bus number is used, for example to specify a destination of data in an ID routing. The ID routing is one method of transferring data by determining a route to the designated destination, and transferring the data along the route.

For example, in Patent Document 1, there is disclosed a method of allocating bus numbers preliminarily to unconnected PCIe devices.

CITATION LIST

Patent Literature

[PTL 1] Japanese Patent Application Laid-Open No. 2011-516964

SUMMARY OF INVENTION

Technical Problem

In a case where the PCIe switches are joined in multiple stages, it is necessary to set the bus numbers for all the PCIe switches at the same time, and the standard for PCIe does not correspond to allocating the bus numbers to the PCIe switches that are expanded afterwards.

Also, the method of allocating the bus numbers preliminarily to the unconnected PCIe devices shown in Patent Document 1 only corresponds to a special case of expanding the PCIe switch which coincides with the bus numbers preliminarily assumed and which is capable of being allocated with the preliminarily assumed bus numbers.

Therefore, in a case of expanding an ordinary PCIe switch having bus numbers in a range determined in the standard for PCIe, there is a problem that the expanded PCIe switch cannot be made usable, unless all of the PCIe switches are once reset, that is, after stopping the back-end network and thereafter allocating the bus numbers.

The present invention has been made in view of the problems mentioned above, and a main object is to provide a bus number allocation method capable of making the expanded PCIe switch usable, in the storage device adopting the PCIe to the back-end network connection, without resetting PCIe connecting units.

Solution to Problem

In order to achieve the above-mentioned object, a PCIe switch of a back-end network of a storage device is connected in series, and a range of continuous bus numbers that are managed and stored in a bus number management table is allocated for a back-end network connection. Thereafter, when newly expanding a PCIe switch, the bus numbers are allocated in an ascending order from a minimum value of allocatable bus numbers to a link between PCIe switches, and to a virtual PCI bus within the PCIe switch, respectively, and the bus numbers are allocated in a descending order from a maximum number of the allocatable bus numbers to a link between the PCIe switch and a drive.

Advantageous Effects of Invention

According to the present invention, in a case of expanding the PCIe switch in the storage device with the PCIe adopted for the back-end network connection, it becomes possible to allocate the bus numbers for the expansion, without the need for changing the allocation of the bus numbers of the already connected PCIe switches. Therefore, it becomes possible to make the expanded PCIe switch usable easily, without stopping the back-end.

BRIEF DESCRIPTION OF DRAWINGS

FIG. 10 is a view illustrating an example of a number pool of a root port to be connected to a back-end in the bus number allocation table.

FIG. 13 is a view illustrating an example of a number pool in a case where the flash device with embedded switch is connected.

DESCRIPTION OF EMBODIMENTS

Hereinafter, as embodiments of the present invention, Embodiment 1 through Embodiment 5 will be successively explained with reference to the accompanying drawings.

Embodiment 1

Figure 1:
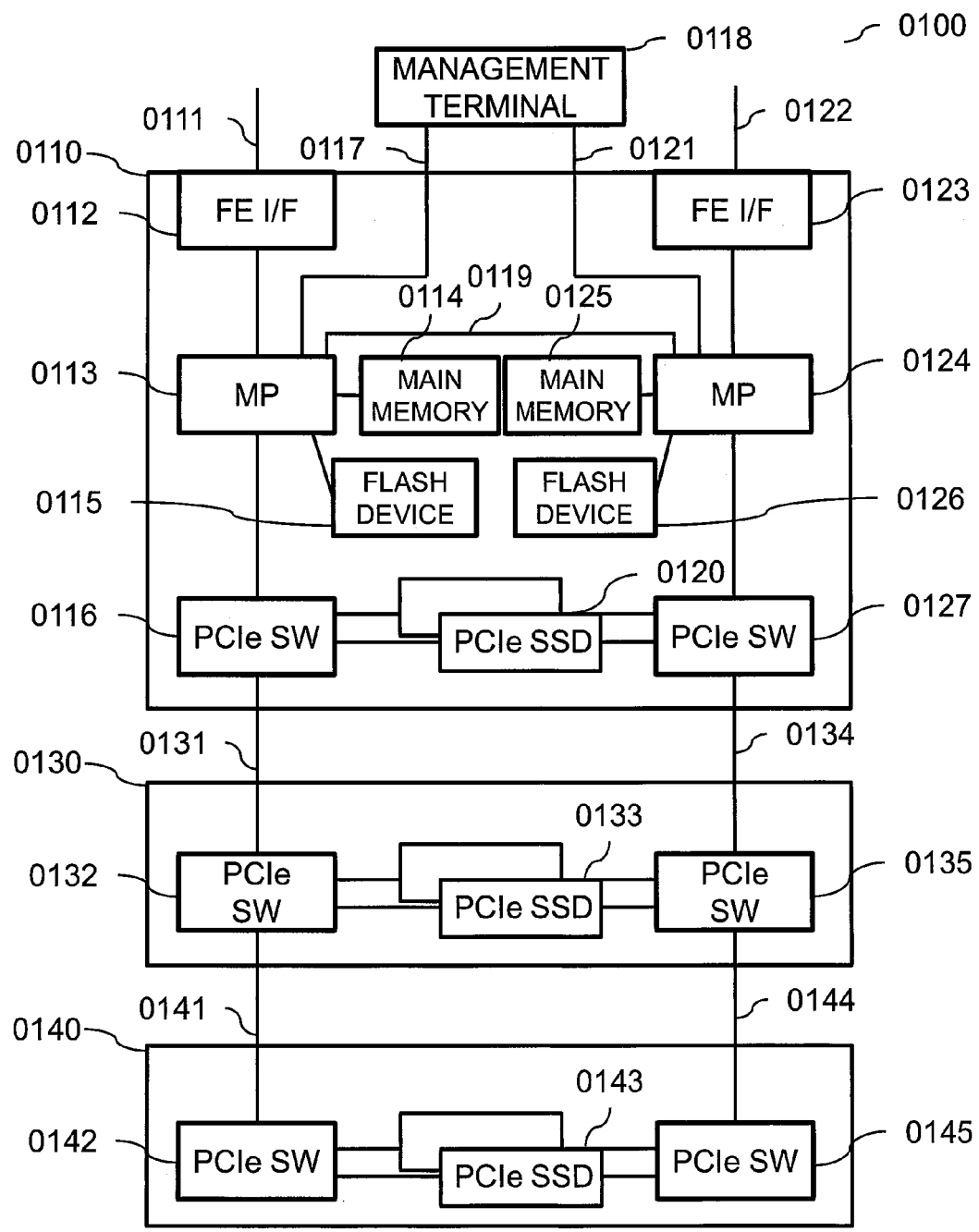
FIG. 1 is a view illustrating a configuration example of a storage device using a PCIe to a back-end.

FIG. 1 is a view showing a configuration example of a storage device according to Embodiment 1.
[Overall Configuration of Storage Device]

A storage device 0100 is configured from a storage controller 0110 and drive chassis 0130, 0140.

The storage controller 0110 is configured from front-end interfaces (FE I/F) 0112, 0113, processors (hereinafter referred to as "MP" in some cases) 0113, 0124, main memories 0114, 0125, flash devices 0115, 0126, switches joined to back-end interface (hereinafter referred to as "PCIe switch, and as "PCIe SW" in some cases) 0116, 0127, and a PCIe-connected SSD 0120.
[FE I/F]

The front-end interfaces 0112, 0123 are connected to a host system via channels not shown, with signal lines 0111, 0122, and converts data transfer protocols between the host system and the storage controller.
[BE I/F]

The back-end interface connects the storage controller 0110 and the drive and the drive chassis 0130. In FIG. 1, an example of using the PCIe interface of MPs 0113, 0124 as the back-end interfaces is shown. In FIG. 1, the back-end interfaces are not shown, as being contained inside the MPs 0113, 0124. The back-end interface is configured to have a downstream port for connecting the PCIe-connected SSD 0120.

The downstream port may be a part of the switches provided inside the backend interface, or may be a part of a processor.
[Main Memory]

The main memory 0114 is a main storage of the MP 0113, and is stored with programs executed by the processor (MP) (a storage control program, a program for processing allocation of bus numbers according to the present invention, and the like), and management tables the processor (MP) refers to, and the like.

Similarly, the main memory 0125 is a main storage of the MP 0124.

Further, the main memories 0114, 0125 are also used as cache memories of the storage controller 0110.
[Flash Device]

The flash device is a non-volatile medium, and is used as a data cache to which data is stored temporarily.

In FIG. 1, the flash device 0115 is connected to the MP 0113 via the PCIe interface, and similarly, the flash device 0126 is connected to the MP 0124 via the PCIe interface.
[Processor (MP)]

The processor (MP) controls the data transfer between the host system connected via the front-end interface and the HDD or SSD connected via the back-end interface. Further, the processor (MP) executes the allocation of bus numbers according to the present invention.

The MP 0113 and the MP 0124 are mutually connected by the signal line. By doing so, the MP 0113 is accessible to the memory 0125, and the MP 0124 is accessible to the memory 0114.

Further, a root complex to be shown in the next figure onwards is regarded as being contained in the processor (MP) in FIG. 1.
[Management Terminal]

A management terminal 0118 is configured to have an input device for an administrator of the storage device 0100 to input setting information to the storage controller 0110, and is configured to have a display device for the storage controller 0110 to display information of the storage device 0100 to the administrator of the storage device 0100.
[Drive Chassis]

The drive chassis 0130 is configured to have a PCIe switch 0132, a PCIe switch 0135 and a connector (not shown). The connector is capable of being connected with a PCIe-connected SSD equipped with a dual port.

In FIG. 1, the connector is omitted, and only a PCIe-connected SSD 0133 connected to the connector is shown.

The switch 0132 and the PCIe-connected SSD 0133, and the switch 0135 and the PCIe-connected SSD 0133, are respectively connected via the signal line and the connector.

The drive chassis 0140 has a configuration similar to the drive chassis 0130.
[Connection Between Controller and Drive Chassis]

The storage controller 0110 and the drive chassis 0130 are connected by a link. The link indicates a connection with a physical signal line. In PCIe, the link is managed as a bus, and the link will be referred hereinafter in the present embodiment as a PCIe bus or simply as a bus.

In FIG. 1, as a first system, the two are connected via a downstream port of the PCIe switch 0116, a signal line 0131 and an upstream port of the PCIe switch 0132.

Further, as a second system, the two are connected via a downstream port of the PCIe switch 0127, a signal line 0134 and an upstream port of the PCIe switch 0135.

Similarly, the drive chassis 0130 and the drive chassis 0140 are connected via the link.

In FIG. 1, as the first system, the two are connected via a downstream port of the PCIe switch 0132, a signal line 0141 and an upstream port of a PCIe switch 0142.

Further, as the second system, the two are connected via a downstream port of the PCIe switch 0135, a signal line 0144 and an upstream port of a PCIe switch 0145.

[Number of Drive Chassis]

In FIG. 1, two drive chassis (0130, 0140) are shown. However, the number of the drive chassis may be 0, 1, or 3 or more. In a case where the number is 3 or more, the drive chassis are mutually connected by the link in which a connection topology is in series, as is shown in FIG. 1.

[Root Complex]

Figure 2:
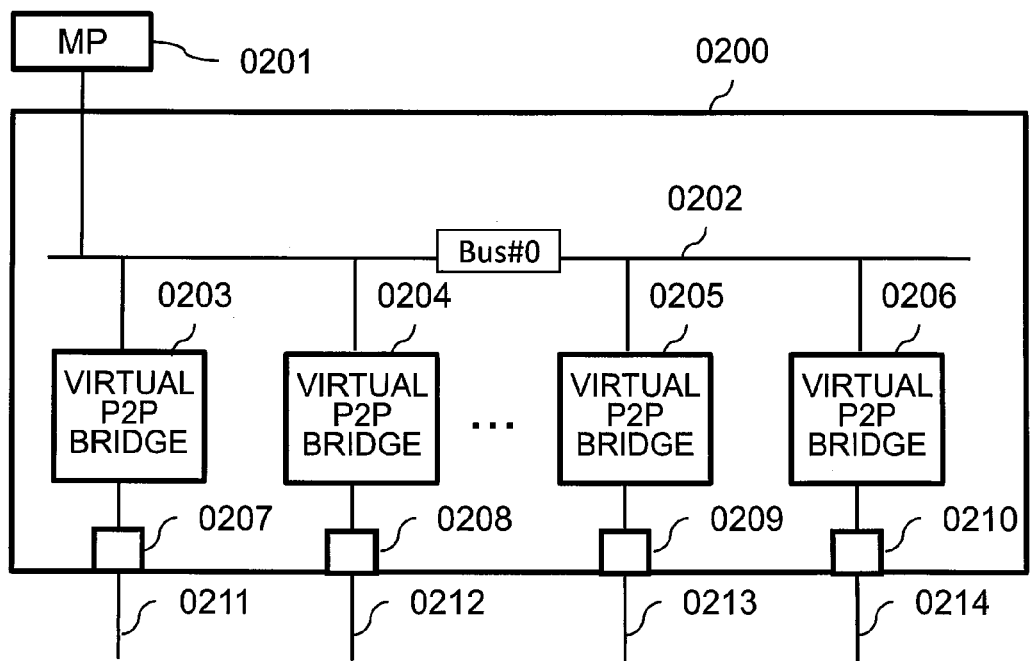
FIG. 2 is a view illustrating a configuration example of a root complex which has a plurality of root ports.

FIG. 2 is a view showing a configuration example in which a root complex has a plurality of root ports. The root complex is a top in an I/O hierarchy connecting the MP or the memory subsystem to the I/O device. In FIG. 1, the root complex is not shown as being included in the MPs 0113, 0124.

The MP 0201 is connected with a plurality of virtual PCI-PCI bridges (hereinafter referred to as "virtual P2P bridge") via a virtual PCIe bus (Bus #0) 0202. In FIG. 2, the virtual P2P bridges 0203, 0204, 0205, and 0206 are connected as an example.

The virtual P2P bridge each connects to a root port. In FIG. 2, as an example, the virtual P2P bridges 0203, 0204, 0205, and 0206 are respectively connected to root ports 0207, 0208, 0209, and 0210. The root port is connected to a port of an end point, or to the upstream port of the PCIe switch, via the link. A part of the root ports is used as the back-end interface. In FIG. 2, as an example, the links 0211, 0212, 0213 and 0214 are connected to the root ports 0207, 0208, 0209, and 0210.

[Bus Number Management Table]

Figure 3:
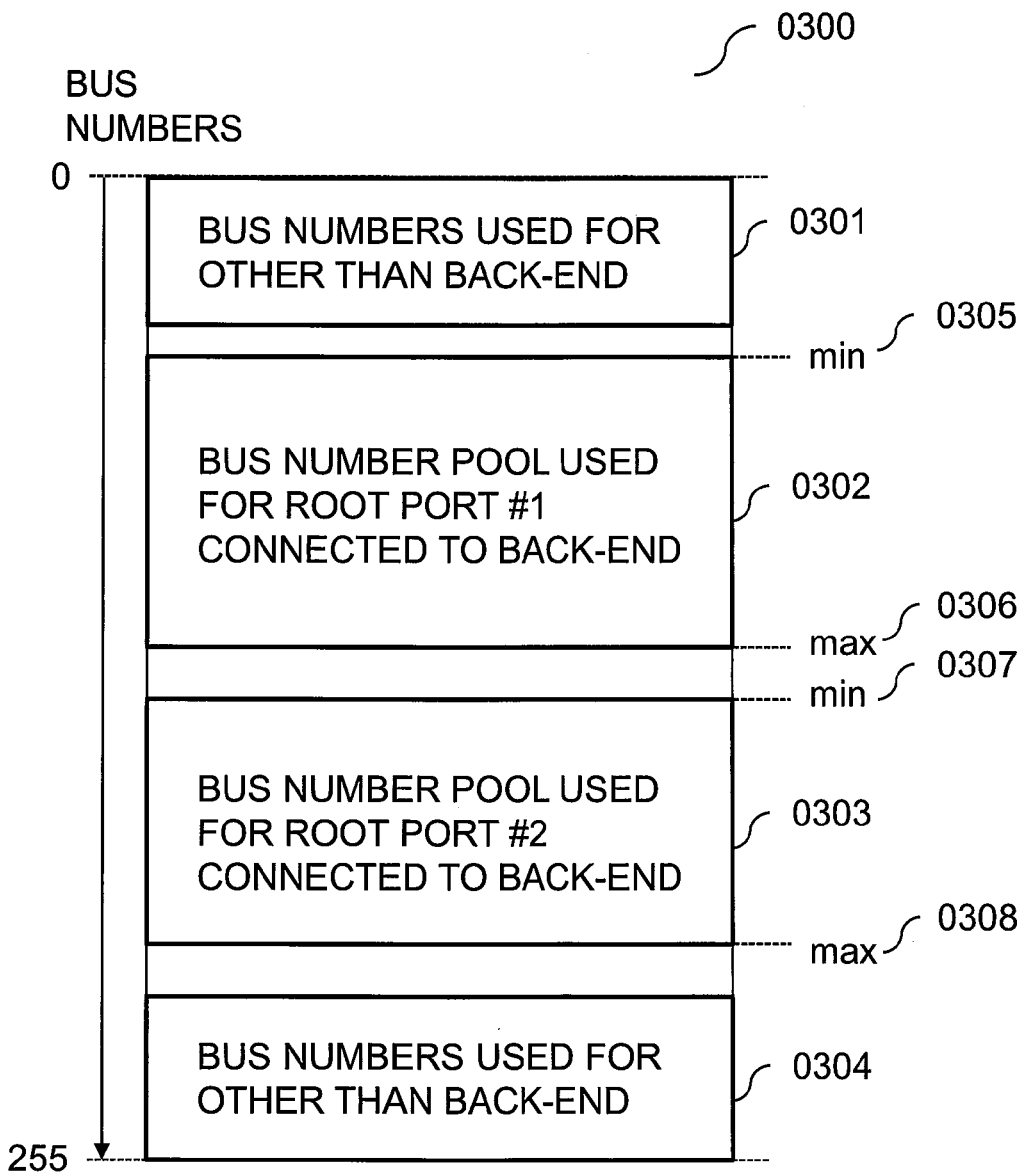
FIG. 3 is a view illustrating an example of a bus number management table.

FIG. 3 shows an example of a bus number management table. The bus number management table is stored in the main memories 0114, 0125.

The bus number takes a value from 0 to 255, according to the standard of PCIe. A start portion 0301 and an end portion 0304 of the bus numbers are, for example, allocated to a bus of the front-end interface and the flash device, or to a bus managed by the CPU, and are used for other than the back-end. The bus numbers other than those explained above are used for back-end.

The bus number must be set so as to make an ID routing, which will be explained below, to be performed normally.

An interface standard managing the connections of the switches, devices, and links envisaged in the present embodiment has the connecting topology of a tree structure. Nodes (apexes, node points) of the tree correspond to the switches or the devices, and edges (branches) correspond to the links. Each node and edge is allocated with a number on the assumption that they each have a unique number with no duplication, which is a larger number as a distance from the apex (corresponds to a number of edges from the apex) becomes farther, and the numbers are allocated so that a subtree (a part of the tree structure and which has its own tree structure) and other subtrees not included in the subtree has a range of numbers with no duplication. In the present embodiment, PCIe is being assumed.

The bus number used in the back-end may be divided into a plurality of portions corresponding to the root port. In the example of FIG. 3, a region 0302 with continuous bus numbers is secured and allocated to a root port #1 connected to the back end. The region with continuous bus numbers is called a bus number pool. One bus number pool corresponds to one root port connected to the back-end. The bus number pool used for the root port #1 has a minimum value min 0305 and a maximum value max 0306 of the bus numbers. Similarly, a root port #2 connected to the back end is allocated with a region 0303 with continuous bus numbers, and the bus number pool used for the root port #2 has a minimum value min 0307 and a maximum value max 0308 of the bus numbers.

Next, an allocation procedure of the bus numbers will be explained, first explaining a conventional allocation procedure, and thereafter explaining the allocation procedure of the present invention.

[Conventional Allocation Procedure of Bus Number]

Figure 4:
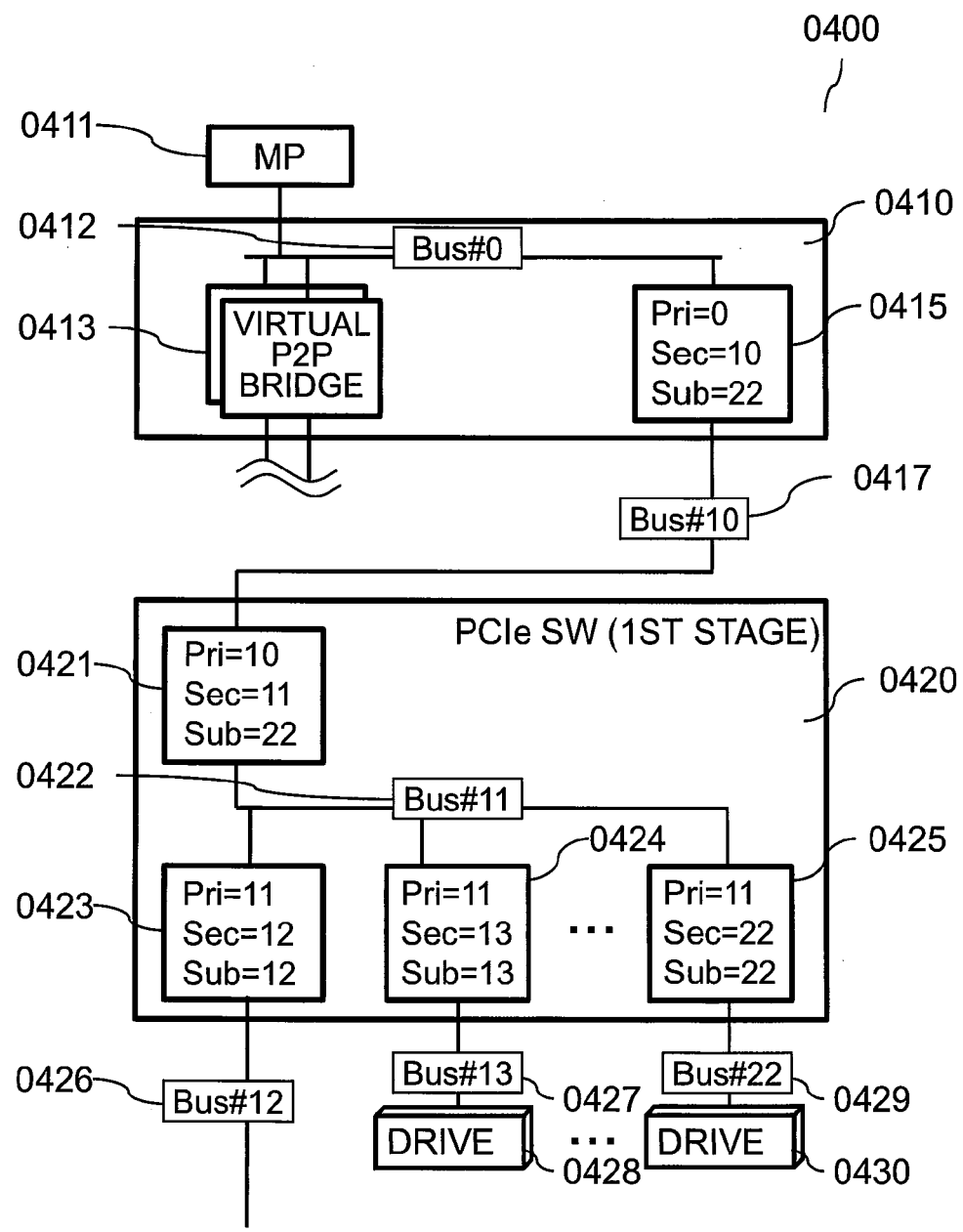
FIG. 4 is a view illustrating an allocation of bus numbers prior to adding a PCIe switch (second stage) (conventional method).

FIG. 4 is a view illustrating an example of a back-end configuration of the storage device before expanding the PCIe switch.

A back-end 0400 is configured from a MP 0411, a root complex 0410, and a first stage PCIe switch 0420.

The root complex 0410 is configured to have a virtual PCI bus 0412, a plurality of virtual P2P bridges 0413, 0415 and a plurality of root ports (not shown). A part of the virtual P2P bridges are used as the back-end thereof. In FIG. 4, only the virtual P2P bridge 0415 is used.

The first stage PCIe switch 0420 is configured to have a an upstream port (not shown) and a virtual P2P bridge 0421 connected thereto, a virtual PCI bus 0422, a downstream port (not shown) connected to a PCIe switch and a virtual P2P bridge 0423 connected thereto, a downstream port (not shown) connected to a drive and virtual P2P bridges 0424, 0425 connected thereto. The virtual P2P bridge 0423 is used to connect to a second stage PCIe switch (not shown).

In FIG. 4, bus numbers Bus #1 through Bus #9 and bus numbers BUS #246 through #255 are used for other than back-end, and Bus #10 through Bus #245 may be used as the bus numbers for the back-end.

The root complex 0410 and the first stage PCIe switch 0420 are connected via a link 0417 connecting a downstream port of the virtual P2P bridge 0415 and an upstream port of the virtual P2P bridge 0421.

The first stage PCIe switch 0420 and a drive 0428 are connected via a link 0427 between a downstream port of the virtual P2P bridge 0424 and a port (upstream) of a drive 0428.

Similarly, the first stage PCIe switch 0420 and a drive 0430 are connected via a link 0429 between a downstream port of the virtual P2P bridge 0425 and a port (upstream) of the drive 0430.

In the example of FIG. 4, a case where the number of drives linked to the PCIe switch 0420 and the virtual P2P bridges linked to the drives are each 10, is envisaged. However, only two each are shown in the figure, and all the others are omitted.

Before explaining the allocation procedure of the bus numbers, explanation will first be given on an ID routing of PCIe.

The ID routing is a method of designating an address of a packet in a set of the bus number, a device number, and a function number, and transmitting the packet to the device joined directly below the corresponding bus number. For example, ID routing is used in the transfer of completion data.

In order to perform ID routing, the virtual P2P bridge and the virtual P2P bridge of the PCIe switch are set with each values of Primary Number (hereinafter referred to as "Pri"), Secondary Number (hereinafter referred to as "Sec"), and Subordinate Number (hereinafter referred to as "Sub").

In this regard, the bus joined to an upper side than the bridge, that is, the bus joined to the MP side is called a primary bus, and the bus connected to a lower side is called the secondary bus.

Pri indicates the bus number of the primary bus, Sec indicates the bus number of the secondary bus, and Sub indicates a maximum value among the bus numbers connected to a lower side.

As an example of the ID routing, a case for example where the MP 0411 transmits the packet to the drive 0430 joined to the bus number Bus #22 0429 will be shown next.

First, in the virtual PCI bus 0412, the data is transferred with respect to the virtual P2P bridge in which the bus number thereof is in a range of the value of Sec and the value of Sub, that is, to the virtual P2P bridge 0415. Subsequently, the virtual P2P bridge 0415 transfers the data to the virtual P2P bridge 0421 joined to the downstream port.

Similar to the routing of the virtual PCI bus 0412, in the virtual PCI bus 0422, the data is transferred with respect to the virtual P2P bridge in which the bus number thereof is in the range of the value of Sec and the value of Sub, that is, to the virtual P2P bridge 0425. Lastly, the data is transferred from the virtual P2P bridge 0425 to the drive 0430.

In the conventional allocation procedure, in order to correspond to a general topology, the bus numbers are allocated giving priority to depth. That is, the bus numbers are allocated by incrementing in the order searched with priority given to the link between the root complex and the PCIe switch, the virtual PCI bus within the PCIe switch, and the link between the PCIe switches. A program for the allocation procedure is executed by the MP 0411.

First, the search of the links and the buses is performed from the link and bus close to the root complex. With the search, the link 0417 between the root complex and the PCIe switch is found, and the bus number Bus #10 is allocated to the link 0417.

With the next search, the virtual PCI bus 0422 within the first stage PCIe switch 0420 is found, and the bus number Bus #11 is allocated to the virtual PCI bus 0422.

Further, with the next search, a link 0426 for connecting the first stage PCIe switch 0420 and a second stage PCIe switch (not shown) is found, and the bus number Bus #12 is allocated to the link 0426.

Since it is before expansion of the PCIe switch and a second stage PCIe switch is not found by the search, the search giving priority to depth is completed, and subsequently bus numbers are allocated to the links joined to the drives.

That is, the links between the PCIe switches and the drives are searched for, and the bus numbers are incremented and allocated in the searched order.

By the search for the link connected to the drive, a link 0427 between the PCIe switch 0420 and the drive 0428 is found, and the bus number Bus #13 is allocated to the link 0427. In FIG. 4, only two each of the drives joined to the PCIe switch and the virtual P2P bridges joined to the drives are shown, and all the others are omitted, however, the bus numbers are allocated to the links joined to ten drives. With respect to a link 0429 between the PCIe switch 0420 and the tenth drive 0430, the bus number Bus #22 is allocated. This completes the allocation of the bus numbers.

[Allocation Procedure of Conventional Bus Number During Expansion]

Next, explanation will be given on the conventional bus number allocation procedure upon expansion of the PCIe switch.

Figure 5:
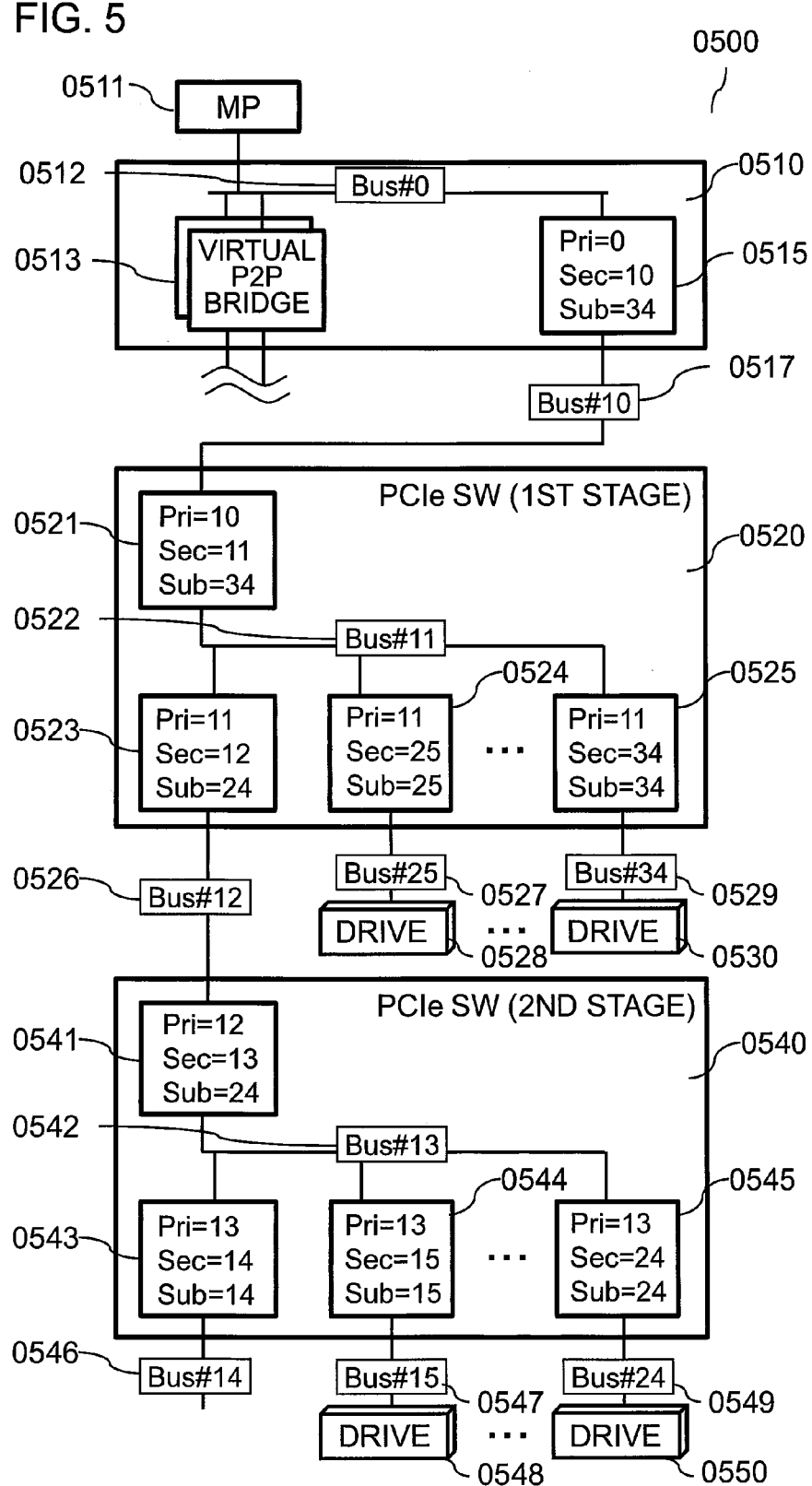
FIG. 5 is a view illustrating the allocation of the bus numbers after adding the PCIe switch (second stage) (conventional method).

FIG. 5 is a view showing a back-end configuration of the storage device when the PCIe switch is newly expanded to the back-end configuration of FIG. 4.

The difference from the configuration of FIG. 4 is the newly-expanded second stage PCIe switch 0540. The configuration of the second stage PCIe switch 0540 is similar to that of the first stage PCIe switch 0520, so that the explanation thereof will be omitted.

The first stage PCIe switch 0520 and the second stage PCIe switch 0540 are connected via a link 0526 connecting a downstream port of a virtual P2P bridge 0523 and an upstream port of a virtual P2P bridge 0541.

The second stage PCIe switch 0540 and a drive 0548 are connected via a link 0547 between a downstream port of a virtual P2P bridge 0544 and a port (upstream) of the drive 0548.

Similarly, the second stage PCIe switch 0540 and a drive 0550 are connected via a link 0549 between a downstream port of a virtual P2P bridge 0545 and a port (upstream) of the drive 0550.

In the example of FIG. 5, similar to FIG. 4, a case where the number of drives joined to the PCIe switch and the virtual P2P bridges joined to the drives are each 10, is shown. However, only two each are shown in the figure, and all the others are omitted.

A virtual P2P bridge 0543 of the second stage PCIe switch 0540 is used for connecting to a third stage PCIe switch (not shown).

It is necessary to allocate bus numbers that are larger than Bus #12 that is the bus number of the link 0526, and that are continuing from Bus #12, to the virtual PCI buses within the PCIe switches, the links between the PCIe switches, and the links between the PCIe switches and the drives, after the second stage connected ahead of the link 0526.

However, the bus number #13 is allocated to the link 0427 before the PCIe switch expansion, so that there are no bus numbers left to be allocated to the portion ahead of the link 0526.

It is not possible to change the once-allocated PCIe bus numbers during activation of the system. Therefore, in order to use the drives of the expanded PCIe switch, it is necessary to allocate the bus numbers after once resetting all the PCIe switches, that is, after stopping the back-end network.

The result of performing the allocation procedure of the bus number once again, in the back-end configuration after expansion of the PCIe switch, is shown in FIG. 5. The flow of the procedure is the same as that explained in FIG. 4, so that the details thereof will be omitted.

As a difference from FIG. 4, the bus numbers are allocated to the second stage PCIe switch giving priority to depth, after the first stage. That is, the bus number Bus #13 is allocated to a virtual PCI bus 0542 of the second stage PCIe switch, and the bus number Bus #14 is allocated to a link 0546 joined to the third stage PCIe switch (not shown).

In the ten drives joined to the second stage PCIe switch, the bus number Bus #15 is allocated to the link 0547 between the second stage PCIe switch and the first drive 0548, and the bus number Bus #24 is allocated to the link 0549 between the second stage PCIe switch and a tenth drive 0549.

Similarly, in the ten drives joined to the first stage PCIe switch, the bus number Bus #25 is allocated to a link 0527 between the first stage PCIe switch and a first drive 0528, and the bus number Bus #34 is allocated to a link 0529 between the first stage PCIe switch and a first drive 0530.

After the allocation procedure of the bus numbers are completed as is explained above, the drives joined to the expanded second stage PCIe switch becomes usable.

As is explained above, in the conventional allocation procedure of the bus numbers, the links between the PCIe switches, the virtual PCI buses within the PCIe switches, and the links between the PCIe switches and the drives, are not distinguished, and the bus numbers are sequentially incremented and allocated thereto. Therefore, in a case of expanding PCIe switches, or expanding drives linked to the PCIe switches, it becomes necessary to reset all the PCIe switches as is explained above, that is, to stop the back-end network.

[Allocation of Bus Numbers in Embodiment 1]

Figure 6:
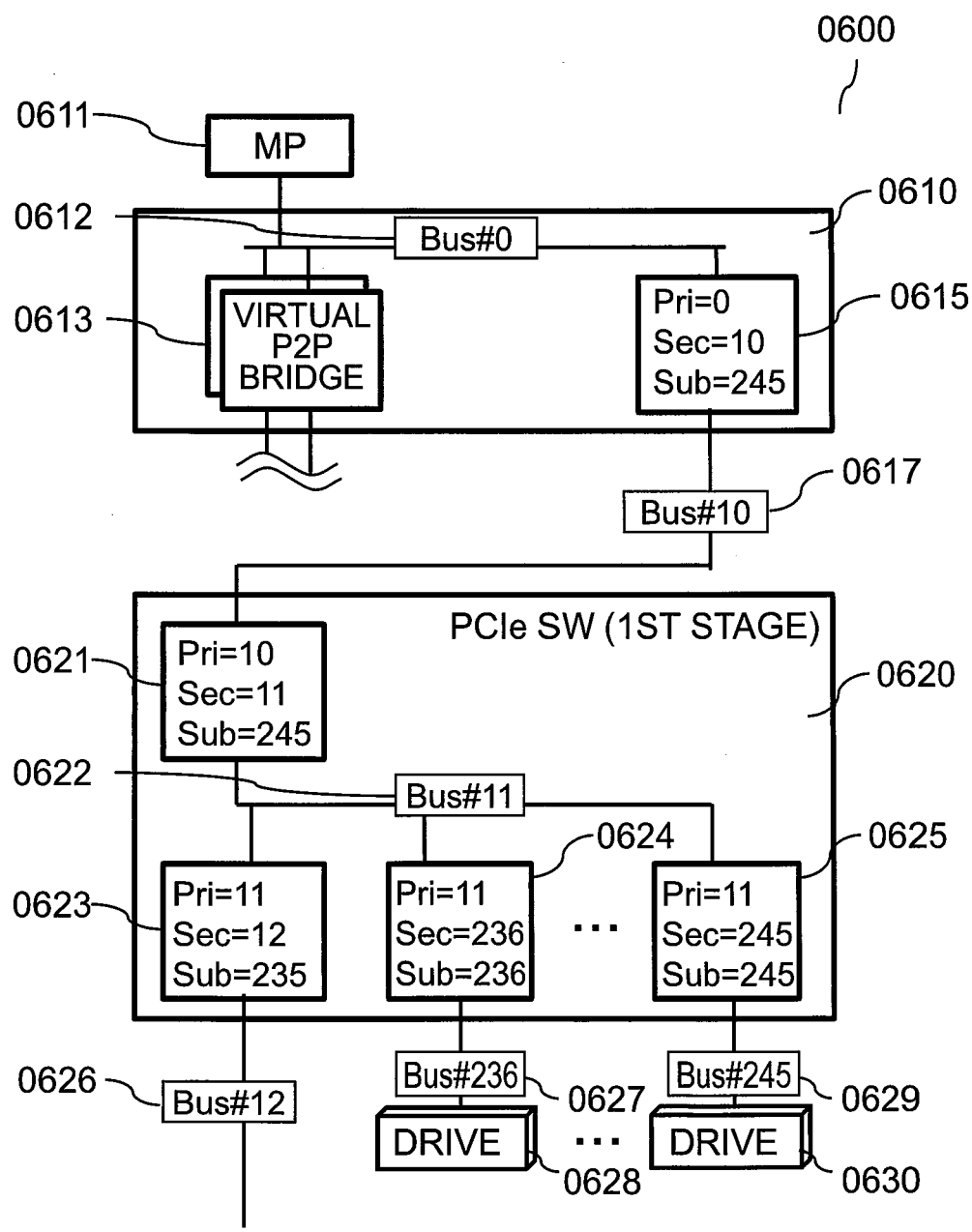
FIG. 6 is a view illustrating the allocation of the bus numbers prior to adding the PCIe switch (second stage) according to the present invention.

Next, the allocation procedure of the bus numbers according to Embodiment 1 of the present invention will be explained. FIG. 6 is a view showing an example of a back-end configuration of the storage device before expanding the PCIe switch, according to Embodiment 1. The back-end configuration of FIG. 6 is the same as the configuration of FIG. 4, so that the explanation of the constituent elements thereof will be omitted.

With respect to the allocation operation of the bus numbers according to Embodiment 1 of the present invention, the allocation procedure of the bus numbers will be explained using the flow chart of FIG. 8. Further, an operation example is a case where the procedure is applied to the configuration of FIG. 6. Hereinafter, a program related to the procedure for performing the allocation of the bus numbers will be executed by the MP, and in the configuration of FIG. 1, the program is read from the main memory and is executed by the MP.

[Allocation Procedure of Bus Numbers (During PCIe Initialization Process)]

Figure 8:
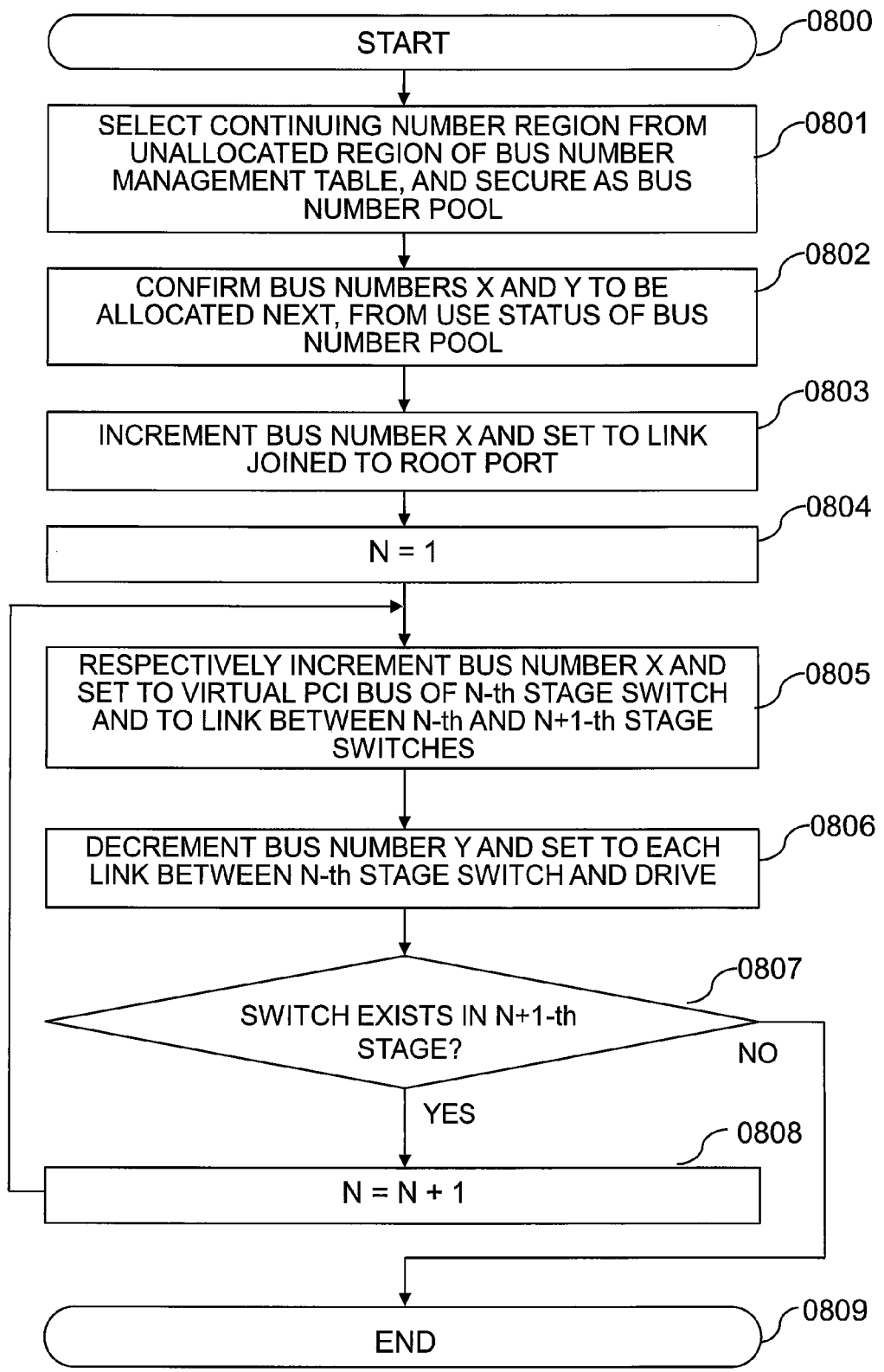
FIG. 8 is a view illustrating a bus number allocation procedure of an expanded storage device in a flowchart.

FIG. 8 is a view showing the bus number allocation procedure of an expanded storage device in a flowchart. The present procedure is performed in a state where no bus numbers are allocated to the PCIe switches of the back-end network, for example when starting the storage device. Immediately after the resetting of the PCIe, all the parameters of the virtual P2P bridges and the PCI buses are in a reset state. Generally, during initialization, all of Pri, Sec, and Sub indicate 0. The bus number is one of a configuration information of the PCIe device including the PCIe switch. The configuration information is set by a configuration access.

The present procedure is to be performed at each root port.

In step 0801, a continuous number region is selected from an unallocated region of the bus number management table (FIG. 3), and is secured as a bus number pool corresponding to the root port.

In the example of FIG. 6, Bus #10 through Bus #245 are secured in the bus number pool of the root port.

In step 0802, from a use status of the bus number pool, bus numbers X and Y to be allocated next are confirmed.

At the start of the present procedure, all the bus numbers in the bus number pool are unallocated, so that the bus number X becomes a minimum bus number in the bus number pool, and the bus number Y becomes a maximum bus number in the bus number pool. In the example of FIG. 6, the bus number X becomes Bus #10, and the bus number Y becomes Bus #245.

In step 0803, the bus number X is incremented and set to the link joined to the root port. Next, to the virtual P2P device having the link as the secondary bus, the bus number of the primary bus is set to Pri, the bus number X which is the bus number of the secondary bus is set to Sec, and the bus number Y which is the maximum value of the bus number joined to the lower side is set to Sub.

In the example of FIG. 6, the bus number X, that is, Bus #10 is allocated to a link 0617. Thereafter, the bus number X is incremented by one, and becomes Bus #11. The Pri of a virtual P2P bridge 0615 becomes Bus #0, Sec becomes Bus #10, and Sub becomes Bus #245.

In step 0804, "1" is assigned to a stage number N of the PCIe switch as the allocation target of the bus number.

In step 0805, the bus number X is respectively incremented and set to the virtual PCI bus within the switch of the Nth-stage, and the link between the N-th stage and an N+1-th stage. Subsequently, to each virtual P2P device, Pri, Sec, and Sub are set in a similar method as in step 0803. The link between the switches may be found by searching for the virtual P2P bridge in the virtual PCI bus in the N-th stage switch. Further, the virtual P2P bridge joined to the link between the switches and the virtual P2P bridges joined to the end points such as the drive may be determined by scanning a header type in a configuration register.

In the example of FIG. 6, the bus number X, that is, Bus #11 is allocated to a virtual PCI bus 0622 of the first stage PCIe switch 0620. The bus number X is incremented by one, and becomes Bus #12. Subsequently, the bus number X, that is, Bus #12 is allocated to a link 0626 between the first stage PCIe switch 0620 and a second stage switch. The bus number X is incremented by one, and becomes Bus #13.

In step 0806, with respect to the virtual PCI bridge having the port connected to the drive among the virtual PCI bridges within the N-th stage switch, the bus number Y is decremented and set to a set value of the bus number corresponding to the link between the port of the virtual PCI bridge and the drive. Subsequently, Pri, Sec, and Sub are set in a similar method as in step 0803 for each virtual P2P device.

Subsequent step 0807 and step 0808 are steps for repeating the above-mentioned setting, in a case where there are switches after N+1-th stage.

Setting of the bus number to the set value of the bus number corresponding to the link between the virtual PCI bridge and the drive, as is explained above, will be expressed simply as setting the bus number to the link between the switch and the drive. This expression will be used hereinafter.

A device number is allocated to the device such as the drive joined to the virtual PCI bus. It may be performed such that the link joined to the N-th stage switch is searched for in the order in which the device number becomes larger, and the bus number may be decremented and set. On the contrary, the link joined to the N-th stage switch may be set by searching for in the order in which the device number becomes smaller, and the bus number may be decremented and set.

In the allocation procedure explained above, the bus numbers are allocated by incrementing from the minimum bus number inside the bus number pool in steps 0803 and 0805, and the bus numbers are allocated by decrementing from the maximum bus number inside the bus number pool in step 0806. The procedure is not limited thereto, and a reverse order may be adopted, in which the bus numbers are allocated by decrementing from the maximum bus number inside the bus number pool in steps 0803 and 0805, and the bus numbers are allocated by incrementing from the minimum bus number inside the bus number pool in step 0806.

In FIG. 6, the bus number Y, that is, Bus #245 is allocated to a bus 0629 between a PCIe switch 0620 and a drive 0630. The bus number Y is decremented by one, and becomes Bus #244. Similarly, the same operation (the bus number Y is decremented by one each and allocated sequentially) is performed until a drive 0628. In FIG. 6, for example the number of drives to be connected to the first stage PCIe switch is set to 10, so that as a result, the bus number Y, that is, Bus #236 is allocated to a bus 0627 between the PCIe switch 0620 and the drive 0628. The bus number Y is decremented by one, and becomes Bus #235.

The values of the bus number X and the bus number Y are once again used during new expansion of the PCIe switch.

[Allocation Procedure of Bus Number (During New Expansion of PCIe Switch)]

Next, the allocation procedure of the bus numbers during expansion of the PCIe switch according to Embodiment 1 of the present invention will be explained.

Figure 7:
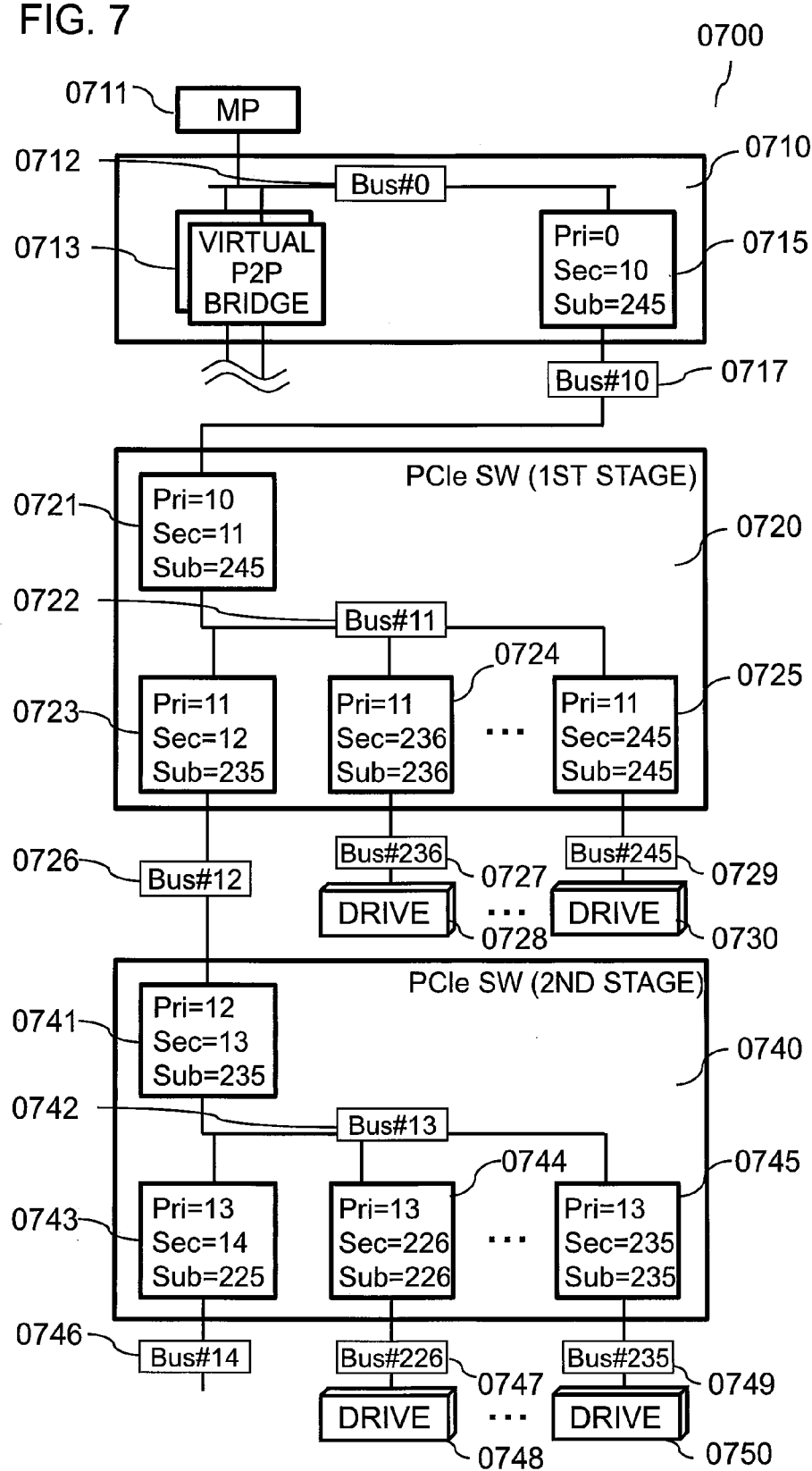
FIG. 7 is a view illustrating the allocation of the bus numbers after adding the PCIe switch (second stage) according to the present invention.

FIG. 7 is a view showing an example of the back-end configuration of the storage device when newly expanding a second stage PCIe switch 0740 to the storage device of FIG. 6.

The configuration of the second stage PCIe switch 0740 is similar to that of the first stage PCIe switch 0720. Further, the back-end configuration of FIG. 7 is the same as the configuration of FIG. 5, so that the explanation of each constituent element will be omitted.

The procedure of the bus number allocation will be explained using the flowchart of FIG. 9. Further, an operation example is a case where the procedure is applied to the configuration of FIG. 7.

Figure 9:
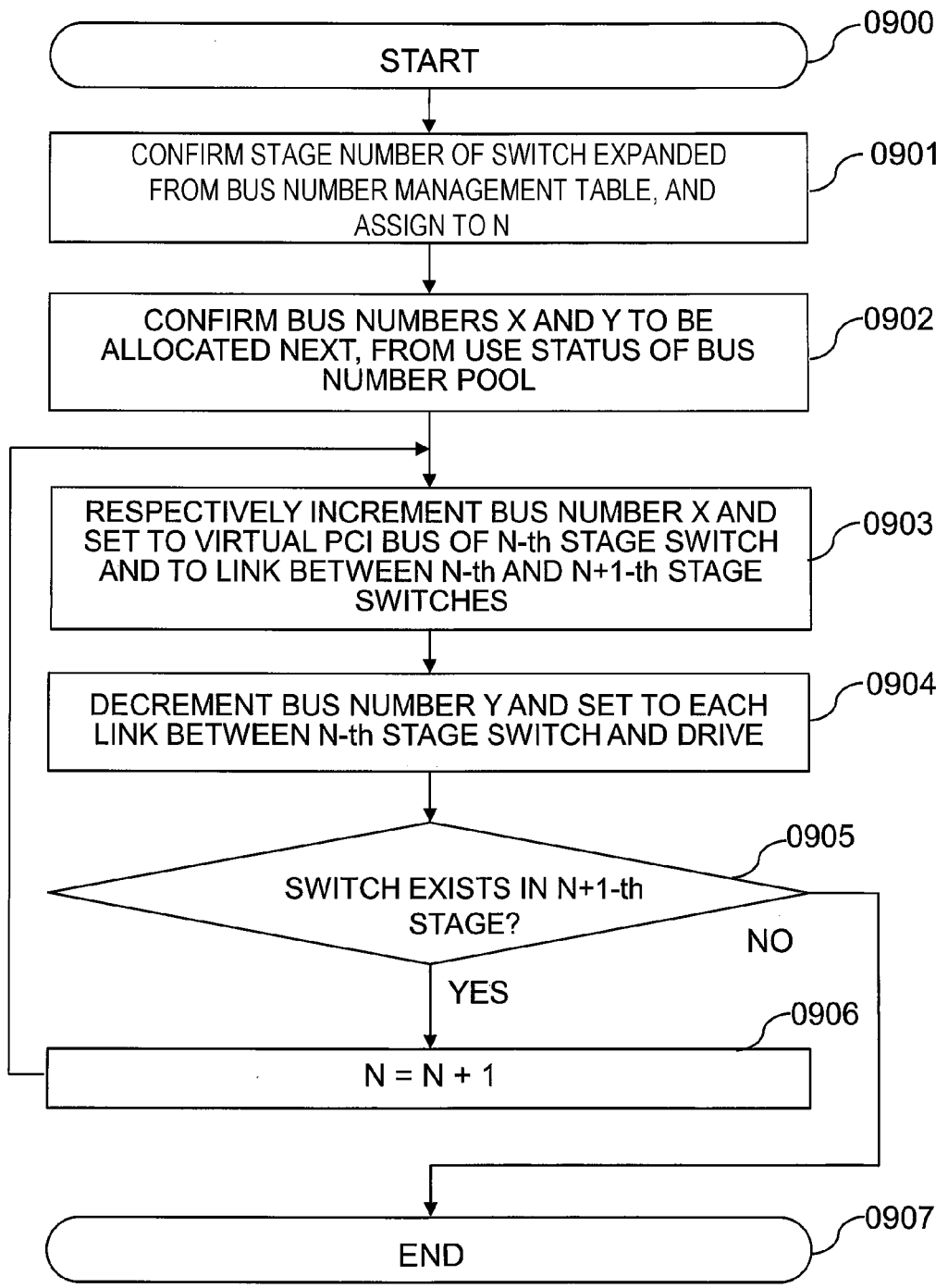
FIG. 9 is a view illustrating the bus number allocation procedure during expansion in a flowchart.

FIG. 9 is a view showing the bus number allocation procedure during expansion in a flowchart.

The present procedure is to be executed at each root port.

In step 0901, a stage number of the expanded switch is confirmed from the bus number management table (FIG. 3), and the number is assigned to N. In the example of FIG. 7, the second stage switch is expanded, so that N becomes 2.

In step 0902, the bus numbers X and Y to be allocated next is confirmed, from the use status of the bus number pool. The example of FIG. 7 is a continuation from the example of FIG. 6, so that the bus number X is Bus #13, and the bus number Y is Bus #235.

Step 0903 through step 0907 are the same as step 0805 through step 0809. In the example of FIG. 7, the bus number X, that is, Bus #13 is allocated to a virtual PCI bus 0742 of the second stage switch. The bus number X is incremented by one, and becomes Bus #14. Subsequently, the bus number X, that is, Bus #14 to a link 0746 joining the second stage and a third stage switches. The bus number X is incremented by one, and becomes Bus #15.

The bus number Y, that is, Bus #235 is allocated to a bus 0749 between a PCIe switch 0740 and a drive 0750. The bus number Y is decremented by one, and becomes Bus #234. The bus number Y, that is, Bus #226 is allocated to a bus 0747 between the PCIe switch 0740 and a drive 0748. The bus number Y is decremented by one, and becomes Bus #225.

The values of the bus number X and the bus number Y are once again used during new expansion of the PCIe switch.

[Number Pool of Root Port Connected to Back-End]

FIG. 10 illustrates an example of a number pool of a root port #1 to be connected to the back-end within the bus number management table. A bus number management table 1000 has two items of a bus number 1001 and an allocation destination information 1002. The allocation destination of the bus number includes, for example, the link between the PCIe switches, the virtual PCI bus within the PCIe switch, and the link between the PCIe switch and the drive. Unallocated indicates a case where no allocation is made.

The content of the bus number management table in FIG. 10 corresponds to the configuration and the allocation of the bus number shown in FIG. 7.

In the example of FIG. 7, the continuous range from Bus #10 through Bus #245 is allocated as the bus number pool of the back-end. Further, in the example of FIG. 7, the root port for the back-end is the root port #1 only, and the continuous range from Bus #10 through Bus #245 is allocated as the bus number pool of the root port #1. The bus numbers and allocation destinations other than those are omitted from the figure.

In FIG. 10, min 1003 indicates the minimum bus number #10 in the bus number pool of the root port #1, and max 1004 indicates the maximum bus number #245 in the bus number pool of the root port #1.

The min 1003 and the max 1004 respectively corresponds to the min 0305 and the max 0308 of the bus number management table 0300 of FIG. 3.

The bus number 10 (1010) is allocated to a link 0717 between the root port #1 and the first stage PCIe switch 0720.

The bus number 11 (1011) is allocated to a virtual PCI bus 0722 of the first stage PCIe switch 0720.

The bus number 12 (1012) is allocated to a link 0726 between the first stage PCIe switch 0720 and the second stage PCIe switch 0740.

The bus number 13 (1013) is allocated to the virtual PCI bus 0742 of the second stage PCIe switch 0740.

The bus number 14 (1014) is allocated to the link 0746 between the second stage PCIe switch 0740 and a third stage PCIe switch (not shown).

The bus number 15 (1015) through the bus number 225 (1016) are unallocated, and are used when the PCIe switch is connected to the third stage onwards.

The bus number 226 (1017) is allocated to the link 0747 between the second stage PCIe switch 0740 and a drive #1 (0748).

The bus number 235 (1018) is allocated to a link 0749 between the second stage PCIe switch 0740 and a drive #10 (0750).

The bus number 236 (1019) is allocated to a link 0727 between the first stage PCIe switch 0720 and the drive #1 (0728).

The bus number 245 (1020) is allocated to a link 0729 between the first stage PCIe switch 0720 and the drive #10 (0730).

According to the present Embodiment 1, it becomes possible to simplify management of the bus numbers, in the bus management method with a necessity of assigning continuous bus numbers to an expanded chassis expanded in series from a base chassis, and also to assign bus numbers to other buses within the expanded chassis. Specifically, in the storage device in which the PCIe is adopted to the back-end network connection, it is not necessary to change the allocation of the bus numbers of the PCIe switches already connected, in a case where a drive chassis equipped with the PCIe switch is expanded. Therefore, it becomes possible to place the expanded chassis under the bus number management based on a rule, and use the PCIe switch of the expanded drive chassis, and the drives and the devices connected to the drive chassis, without stopping the back-end network.

As a result thereof, users performing large-scale data processing, such as a big data analysis, may correspond quickly and have high-speed access to the large-scale data, and may improve data processing performance with the storage device applied with the present Embodiment 1.

Embodiment 2

Embodiment 2 is an embodiment related to the allocation of the bus numbers in a case where the bus numbers are shared among a plurality of MPs.

Figure 11:
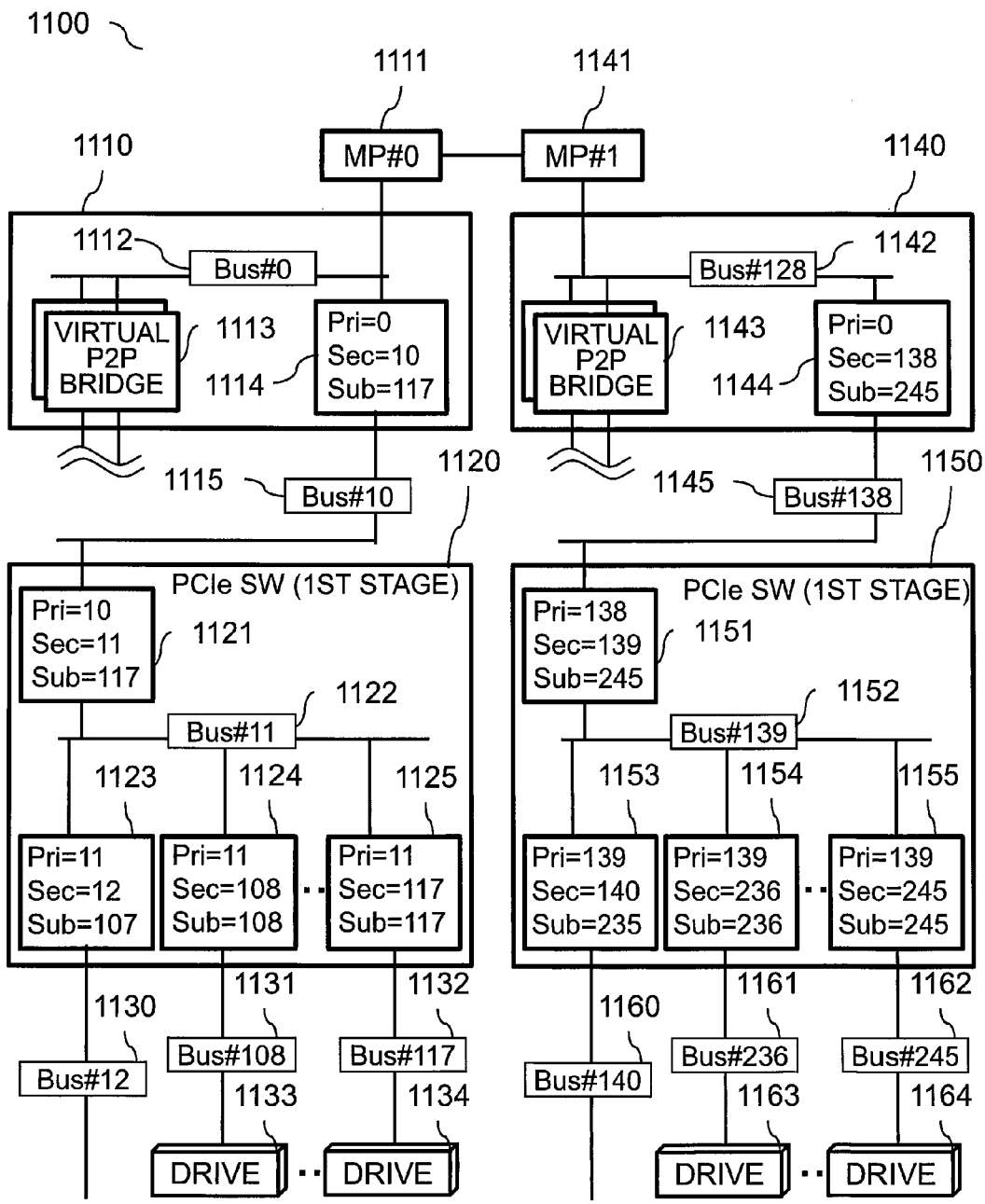
FIG. 11 is a view illustrating an example of sharing the bus numbers among a plurality of MPs, according to Embodiment 2.

FIG. 11 is a view illustrating an example of sharing the bus numbers among the plurality of the MPs. A back-end 1100 of the storage device is configured from root complexes 1110, 1140, and first stage PCIe switches 1120, 1150. An MP #0 1111 and an MP#1 1141 are connected by the signal line. The root complexes 1110 and 1140, and the PCIe switches 1120 and 1150, are the same as the configuration of FIG. 6. The number of stages of the PCIe switches joined to the root complexes 1110, 1140 may respectively be more than two stages, or may have different number of stages.

The virtual P2P bridge of the root complex 1110 is joined to the root port #1 (not shown). The virtual P2P bridge of the root complex 1140 is joined to the root port #2 (not shown). The root port #1 and the root port #2 are respectively joined to the back-end network of a different system.

As the allocation of the bus numbers, the allocation procedure of the bus numbers shown in FIG. 8 of Embodiment 1 is applied to the back-end network joined to each root port.

FIG. 11 shows an example of a case where the bus numbers Bus #10 through Bus #117 as the range of continuous bus numbers are allocated as the bus number pool of the root port #1 in the bus number management table, in step 0801 of FIG. 8. The minimum bus number in the bus number pool is Bus #10, and the maximum bus number is Bus #117.

Further, the range of continuous bus numbers without overlap is allocated to each MP, by the administrator inputting the same in advance. For example, the ranges of continuous bus numbers that are equally divided by the number of MPs are allocated to each of the MP. Further, the range of the bus numbers securing the necessary bus numbers, by calculating the necessary bus numbers taking into consideration the number of drives, the number of expanded chassis to be connected to the back-end network under each MP, may be set to each MP.

Further, FIG. 11 shows an example of a case where the bus numbers Bus #138 through Bus #245 as the range of continuous bus numbers is allocated as the bus number pool of the root port #2 in the bus number management table, in step 0801 of FIG. 8. The minimum bus number in the bus number pool is Bus #138, and the maximum bus number is Bus #245.

The bus numbers Bus #0 through Bus #9, the bus numbers Bus #118 through Bus #137, and the bus numbers Bus #246 through Bus #255 are allocated to the buses of the front-end interfaces and the flash devices, or to the buses managed by the CPU, and are ranges used for other than the back-end.

The allocation procedure of the bus numbers after step 0802 is the same as the content explained in FIG. 6 or FIG. 7, so that the same will be omitted.

Further, for the allocation of the bus numbers during expansion, the allocation procedure of bus numbers during expansion shown in FIG. 9 of Embodiment 1 is applied, to the back-end network joined to each root port.

As is explained above, according to the present Embodiment 2, the configuration of Embodiment 1 is applied, after allocating the range of the bus numbers usable in a case where the plurality of the MPs are used, to each MP. Therefore, according to the present embodiment, it becomes possible to perform the bus management of the expanded chassis, even in a case where the plurality of the MPs are present, without renumbering the bus numbers, similarly to Embodiment 1.

Embodiment 3

Embodiment 3 is an embodiment related to the allocation of the bus numbers in a case where a flash device with an embedded switch, is connected.

Figure 12:
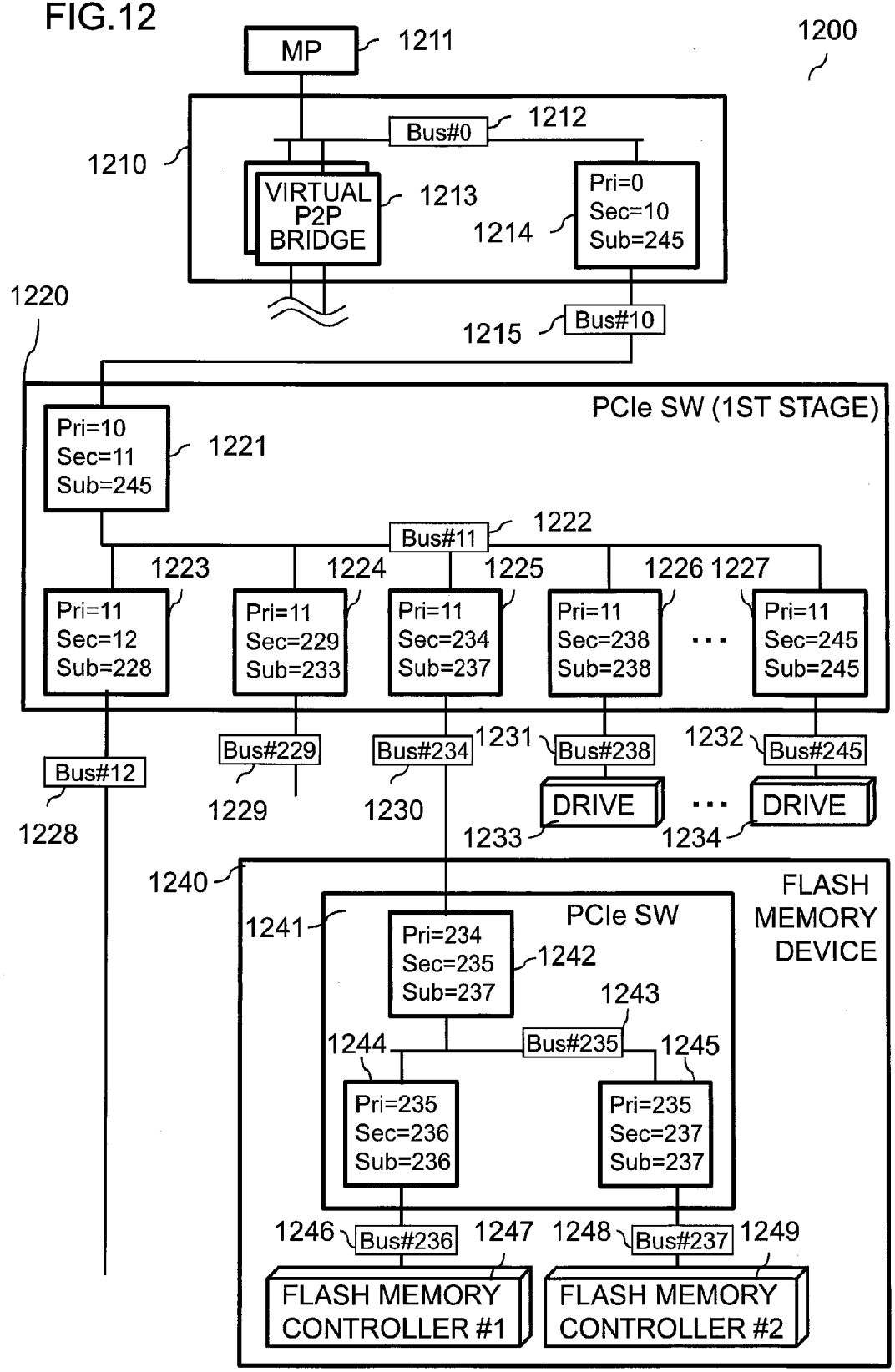
FIG. 12 is a view illustrating an example of the bus number allocation during expansion of a flash device with embedded PCIe switch, according to Embodiment 3.

FIG. 12 is a view illustrating an allocation example of the bus numbers when the flash device with the embedded switch is connected to the downstream port of the PCIe switch.

First, explanation will be given on the back-end configuration. A back-end 1200 of the storage device is configured from a root complex 1210 and a first stage PCIe switch 1220. The root complex 1210 and the PCIe switch 1220 are the same as the configuration of FIG. 6. A virtual P2P bridge 1214 of the root complex 1210 is joined to the root port #1 (not shown). The number of stages of the PCIe switches joined to the root complex 1210 may be two or more.

Further, in the example of FIG. 12, in the PCIe switch 1220, a case where the number of the virtual P2P bridges and the ports (not shown) joined to the drive are both 10, is shown.

The drive is not connected to the port (not shown) joined to a virtual P2P bridge 1224. A device with embedded switch is connected to the port (not shown) joined to a virtual P2P bridge 1225. As an example of the device with embedded switch, a flash memory device 1240 with embedded switch is connected.

The flash memory device 1240 is configured to have a PCIe switch 1241, a flash memory controller #1 1247 and a flash memory controller #2 1249. The flash memory controller #1 1247 and the flash memory controller #2 1249 are end points. The PCIe switch 1241 is configured to have an upstream port (not shown) and a virtual P2P bridge 1242 joined thereto, a virtual PCI bus 1243, and a downstream port (not shown) joined to the flash memory controller and virtual P2P bridges 1244, 1245 joined thereto.

The virtual P2P bridge 1242, the virtual P2P bridge 1244 and the virtual P2P bridge 1245 are connected via the virtual PCI bus 1243. The PCIe switch 1241 and the flash memory controller #1 1247 are connected to a downstream port of the virtual P2P bridge 1244 and a port (an upstream port) of the flash memory controller #1 1247 via a link 1246. Similarly, the virtual P2P bridge 1245 and the flash memory controller #2 1249 are connected to a downstream port of the virtual P2P bridge 1245 and a port (an upstream port) of the flash memory controller #2 1249 via a link 1248.

Next, the allocation of the bus numbers will be explained using FIG. 8 and FIG. 12.

FIG. 12 shows an example of a case where the bus numbers Bus #10 through Bus #245 as the range of the continuous bus numbers is allocated as the bus number pool of the root port #1, in step 0801 of FIG. 8. The minimum bus number in the bus number pool is Bus #10, and the maximum bus number is Bus #117. The procedure up to step 0805 of FIG. 8 is the same as the content explained in FIG. 6 and FIG. 7, so the explanation thereof will be omitted.

In step 0806, it is determined whether a drive is joined to the port used for drive connection, or whether the PCIe switch is joined thereto, in step 0806. Whether to use the port for drive connection, or for connection between switches, is determined preliminarily.

In a case where the drive is joined to the port used for drive connection, similarly to the explanation of FIG. 8, the bus number is allocated to the link between the PCIe switch and the drive. Further, in a case where the PCIe switch is joined to the port used for drive connection, the connected drive is determined as the device with embedded PCIe switch, and the number of PCI devices within the device is acquired by accessing the device. Hereinafter, the PCIe switch of the device with embedded switch will be referred to as "embedded PCIe switch".

Next, the number of the bus numbers necessary for connecting the devices is calculated from the PCI device numbers and the virtual PCI bus numbers within the device, and the range of the bus number is allocated to the virtual P2P bridge of the PCIe switch. In the example of FIG. 12, the bus numbers Bus #234 through Bus #237 are allocated to the virtual P2P bridge 1225.

As the allocation of the bus numbers of the flash memory device, the procedure of step 0805 and step 0806 in FIG. 8 is executed in each flash memory device. However, the drive in step 0806 is read as the end point within the flash memory device. In the example of FIG. 12, the bus numbers are allocated to a link 1230 between the virtual P2P bridge 1225 and the flash memory device 1240, and the virtual PCI buses and the links within the flash memory device. The end points within the flash memory device are the flash memory controller #1 1247 and the flash memory controller #2 1249.

The allocation procedure will be explained using FIG. 12. In the example of FIG. 12, the bus number X and the bus number Y are Bus #234, Bus #237, respectively.

In step 0805, the bus number X, that is, Bus #234 is allocated to the link 1230 between the PCIe switch 1220 and the flash memory device 1240. The bus number X is incremented by one, and becomes Bus #235. Subsequently, the bus number X, that is, Bus #235 is allocated to the virtual PCI bus 1243 of the embedded PCIe switch 1241. The bus number X is incremented by one, and becomes Bus #236.

Subsequently, in step 0806, the bus number Y, that is, the bus number Bus #237 is allocated to the link 1248 between the PCIe switch 1241 and the flash memory controller #2 1249. The bus number Y is decremented by one, and becomes Bus #236. Subsequently, the bus number Y, that is, the bus number Bus #236 is allocated to the link 1246 between the PCIe switch 1241 and the flash memory controller #1 1247. The bus number Y is decremented by one, and becomes Bus #235.

This completes the bus number allocation of the flash memory device 1240.

In a case where the device with embedded switch is not connected to the port, the bus numbers necessary for connecting the device cannot be calculated in advance. Therefore, the range of the bus numbers may be allocated to the virtual P2P bridge joined to the port used for drive connection in advance, so that the device with embedded switch may be connected to the port. The number of the bus numbers to be allocated is set in advance. For example, in FIG. 12, the device is not connected to the port joined to the virtual P2P bridge 1224, however, Bus #229 and Bus #233 corresponding to the range of the bus numbers are set to the virtual P2P bridge 1224.

Further, instead of allocating the range of predetermined bus numbers in advance to the virtual P2P bridge, it is possible to manage by writing information indicating a reservation for using the bus numbers in the device with embedded switch to an allocation information corresponding to the bus number in the bus number management table.

[Example of Bus Number Management Table when Flash Device with Embedded Switch is Connected]

FIG. 13 illustrates an example where the flash device with embedded switch is connected to the number pool of the root port #1 connected to the back-end in the bus number management table.

The configuration of a bus number management table 1300 is the same as the bus number management table 1000 of FIG. 10, and has two items of a bus number 1301 and an allocation destination information 1302.

The content of the bus number management table of FIG. 13 corresponds to the allocation of the bus numbers in the configuration of FIG. 12. In the example of FIG. 13, the root port for the back-end is the root port #1 only, and the continuous range from Bus #10 through Bus #245 is allocated as the bus number pool of the root port #1. The illustration of the bus numbers and the allocation targets corresponding to the bus numbers other than the above are omitted.

In FIG. 13, min 1303 indicates the minimum bus number Bus #10 in the bus number pool of the root port #1, and max 1304 indicates the maximum bus number Bus #245 in the bus number pool of the root port #1. The min 1303 and the max 1304 respectively corresponds to the min 0305 and the max 0308 of the bus number management table 0300 in FIG. 3.

The bus number 234 (1321) is allocated to the link 1230 between the first stage PCIe switch 1220 and the embedded PCIe switch 1241 of the flash memory device 1240.

The bus number 235 (1322) is allocated to a virtual PCI bus 1243 of the embedded PCIe switch 1241.

The bus number 236 (1323) is allocated to a link 1246 between the embedded PCIe switch 1241 of the flash memory device 1240 and a flash memory controller #1 1247.

The bus number 237 (1324) is allocated to a link 1248 between the embedded PCIe switch 1241 of the flash memory device 1240 and the flash memory controller #2 1249.

The bus number 229 (1319) through the bus number 233 (1320) are reserved, as the bus numbers when the device with embedded switch is to be connected to the port joined to the virtual P2P bridge 1224 of the PCIe switch 1220.

The bus number 15 (1315) through the bus number 218 (1316) are unallocated, and are used when the PCIe switch is connected to the third stage onwards.

The bus number 10 (1310) through the bus number 14 (1314), and the bus number 219 (1317) through the bus number 228 (1318) are the same as in FIG. 10, so that the explanation thereof will be omitted.

When the bus numbers are reserved as the buys numbers when the device with embedded switch is to be connected to the port joined to the virtual P2P bridge, the plurality of the bus numbers reserved cannot be used for other purposes. In order to effectively use existing bus numbers, a part of the ports may be preliminarily set as the port for connecting the device with embedded switch. In this case, two or more bus numbers preliminarily set are reserved to only the ports to be connected to the device with embedded switch.

As is explained above, even in a case where the flash device with embedded switch is connected, it becomes possible to realize the bus number allocation according to the rule without re-allocation, by the present Embodiment 3.

The following cases are cases where the bus number is determined as being insufficient.

A case where no unallocated bus number exists in the number pool

A case where the expanded PCIe switch embedded drive requires bus numbers more than the reserved bus numbers A case where the link joined to the drive is not allocated with the bus number In these cases, it is conceivable that necessary number of the bus numbers cannot be allocated to the PCIe switch embedded drive.

As a countermeasure, for example, a function of reading the bus number management table (FIG. 3), determining the bus number insufficiency, and notifying a usable end point with the bus number allocated and an unusable end point with no bus number allocated, should be provided to the management terminal 0118.

Further, according to the use status of the bus number, it is conceivable that the bus number cannot be allocated to the link joining the PCIe switch and the drive, from the insufficiency of the bus number such that the allocatable bus number does not exist.

As a countermeasure, for example, a function of notifying the link to which the bus number allocation cannot be performed, and a function of displaying the allocation status of the bus number, should be provided to the management terminal 0118.

Further, it is conceivable that a worker may connect the PCIe switch or the drive to the link that cannot be used from the insufficiency of the bus number, by mistake.

Therefore, as the countermeasure, a function of determining whether a device connected to the link is the PCIe switch or the drive, and notifying that the PCIe switch or the drive cannot be used, to the management terminal 0118.

As is explained above, by providing the function of notifying or displaying information corresponding to the insufficiency of the bus number as is mentioned above to the management terminal 0118, it becomes possible to promptly and precisely correspond to understand the allocation status during insufficiency of the bus number, investigate the cause thereof, and give a warning.

Embodiment 4

Embodiment 4 is one of the embodiments related to the allocation of the bus numbers in the storage device provided with an SAS interface at the back-end.

Figure 14:
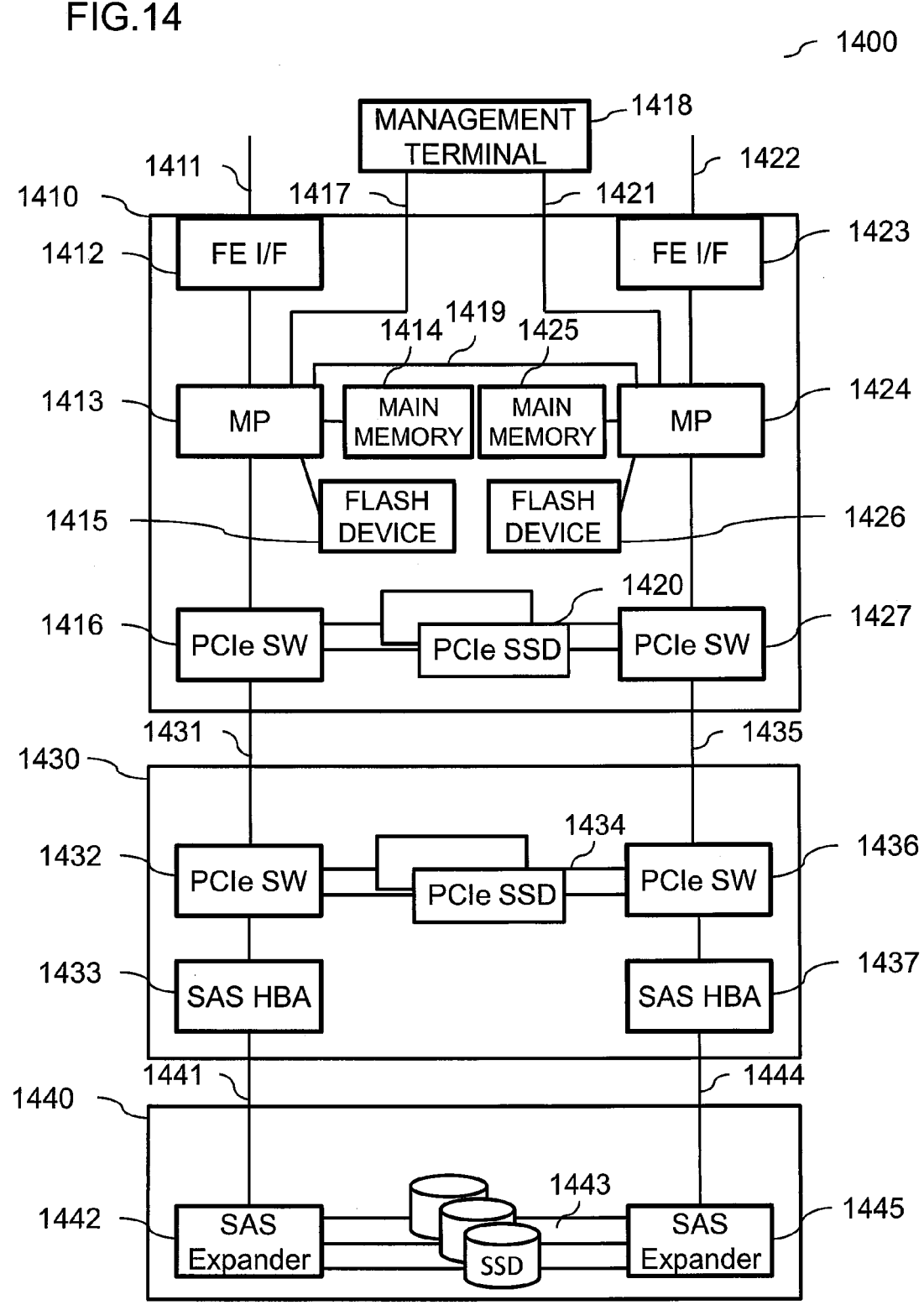
FIG. 14 is a view illustrating a configuration example of a storage device configured to have an SAS interface at the back-end, according to Embodiment 4.

FIG. 14 is a view showing a configuration example of a storage device 1400 related to Embodiment 4. The storage device 1400 is configured from a storage controller 1410 and drive chassis 1430, 1440. The storage controller 1410 has the same configuration as the storage controller 0110 of FIG. 1, so that the explanation thereof will be omitted.

The drive chassis 1430 is configured to have PCIe switches 1432, 1436, a connector (not shown), and SAS host bus adaptors (SAS HBA) 1433, 1437. The connector is capable of being connected with a PCIe-connected SSD having a dual port. In FIG. 14, the connector is omitted, and only the PCIe-connected SSD 1434 connected to the connector is illustrated.

SAS HBA converts a data transfer protocol between a PCIe-connected network and an SAS-connected network.

A controller chassis 1410 and the drive chassis 1430 are connected by links. In FIG. 14, as a first system, the two are connected via a downstream port of a PCIe switch 1416, a signal line 1431, and an upstream port of a PCIe switch 1432. Further, as a second system, the two are connected via a downstream port of a PCIe switch 1427, a signal line 1435 and an upstream port of a PCIe switch 1436. Also, it is possible to connect PCIe switches in multiple stages, beyond the PCIe switches 1432 and 1436. For example, the drive chassis 0140 of FIG. 1 may be connected in multiple stages.

The drive chassis 1440 is configured to have SAS Expanders 1442, 1445 having a role as a switch, and a connector (not shown). The connector is capable of being connected with the HDD and the SAS-SSD equipped with the dual port. In FIG. 14, the connector is omitted, and only the SAS-SSD 1443 connected to the connector is illustrated. The HDD may be connected to the connector.

The SAS Expander 1442 and the SAS-SSD 1443 are connected via the signal line and the connector. Similarly, the SAS Expander 1445 and the SAS-SSD 1443 are connected via the signal line and the connector.

The drive chassis 1430 and the drive chassis 1440 are connected by the link. This link will be referred to as "SAS link".

In the example of FIG. 14, as a first system of the SAS link, a port of the SAS HBA 1433 and an SAS Expander port of the SAS Expander 1442 are connected via a signal line 1441. Further, as a second system of the SAS link, a port of the SAS HBA 1437 and an SAS Expander port of the SAS Expander 1445 are connected via a signal line 1444.

The SAS Expander may be connected in multiple stages beyond the SAS Expanders 1442 and 1445, and for example, the drive chassis 1440 may be connected in multiple stages. A space beyond the SAS Expanders 1442 and 1445 is not a space to be managed by the PCIe, and is a space managed by the SAS, so that it is not necessary to allocate bus numbers thereto.

Embodiment 5

Embodiment 5 is another embodiment with respect to the allocation of the bus numbers in the storage device provided with the SAS interface at the back-end.

Figure 15:
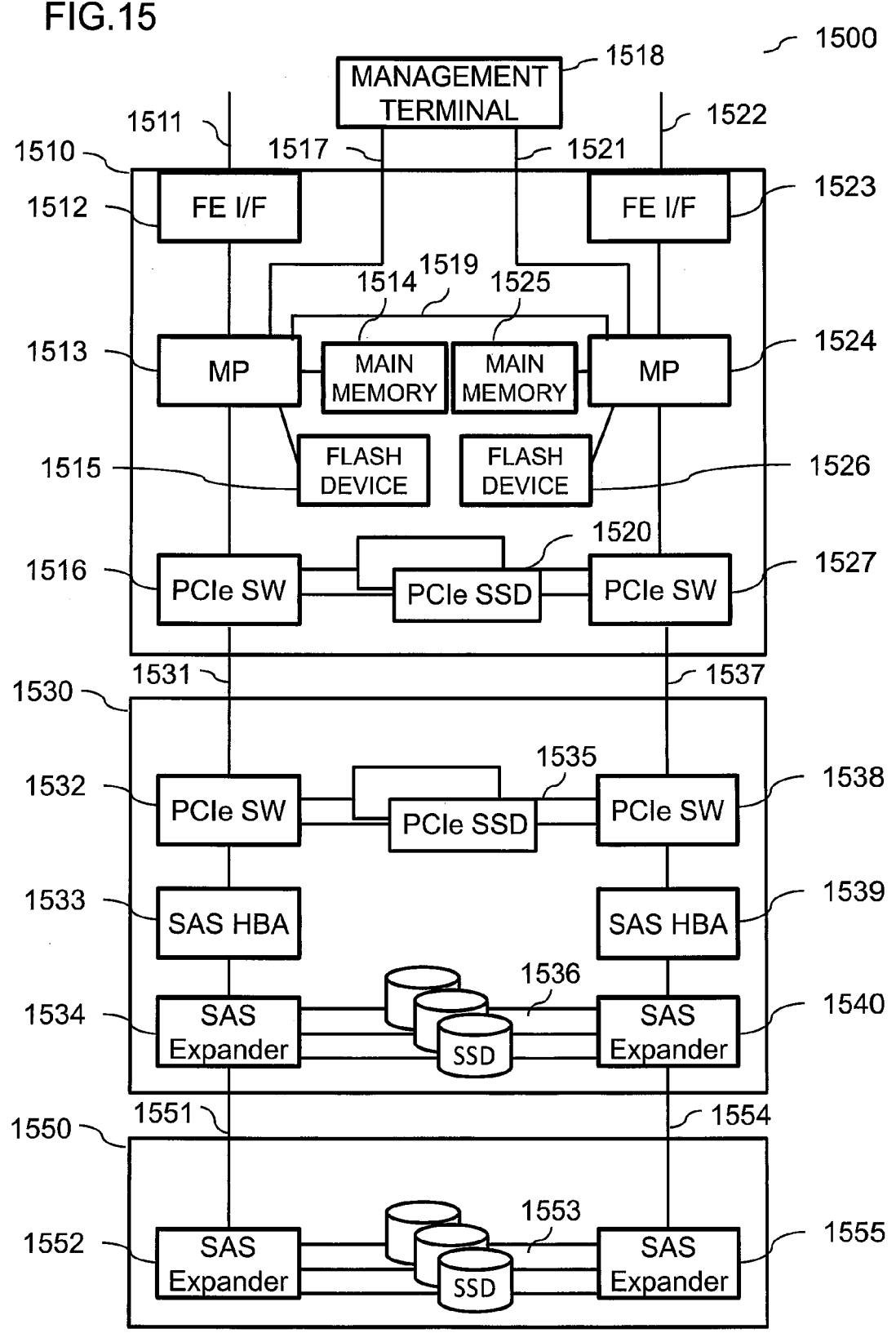
FIG. 15 is a view illustrating another configuration example of the storage device configured to have the SAS interface at the back-end, according to Embodiment 5.

FIG. 15 is a view showing a configuration example of a storage device 1500 according to Embodiment 5. The storage device 1500 is configured from a storage controller 1510 and drive chassis 1530, 1550.

The storage controller 1510 and the drive chassis 1550 are the same configuration as the controller 1410 and the drive chassis 1440 of FIG. 14, so that the explanation thereof will be omitted. Main difference from FIG. 14 is that the drive chassis 1530 is configured to have both the PCIe-connected SSD and the SAS-SSD.

The drive chassis 1530 is configured to have PCIe switches 1532, 1538, a connector #1 (not shown), SAS HBAs 1533, 1539, SAS Expanders 1534, 1540, and a connector #2 (not shown).

The connector #1 is capable of being connected with the PCIe-connected SSD provided with the dual port. In FIG. 15, the connector is omitted, and only a PCIe-connected SSD 1535 connected to the connector is illustrated.

The PCIe switch 1532 and the PCIe-connected SSD 1535 are connected via the signal line and the connector #1. Similarly, the PCIe switch 1538 and the PCIe-connected SSD 1535 are connected via the signal line and the connector #1.

The connector #2 is capable of being connected with the HDD and the SAS-SSD provided with the dual port. In FIG. 15, the connector is omitted, and only the SAS-SSD 1536 connected to the connector is illustrated. The HDD may be connected to the connector.

The SAS Expander 1534 and the SAS-SSD 1536 are connected via the signal line and the connector #2. Similarly, the SAS Expander 1540 and the SAS-SSD 1536 are connected via the signal line and the connector #2.

The controller chassis 1510 and the drive chassis 1530 are connected by the link. The connection is the same as the configuration of FIG. 14, so that the explanation thereof will be omitted.

The PCIe switches may be connected in multiple stages beyond the PCIe switches 1532 and 1538. For example, the drive chassis 0410 in FIG. 1 may be connected in multiple stages.

Further, SAS expanders may be connected in multiple stages, beyond the SAS Expanders 1552 and 1555. For example, the drive chassis 1550 may be connected in multiple stages.

As is explained above, in the present Embodiments 4 or 5, it becomes possible to effectively connect the storage device provided with the SAS interface at the back-end with a variety of modified examples.

REFERENCE SIGNS LIST

0100 Storage device
0110 Storage controller
0118 Management terminal
0112, 0123 Front-end interface (FE I/F)
0113, 0124, 0201 Processor (MP)
0114, 0125 Main memory
0115, 0126 Flash device
0116, 0127, 0132, 0135, 0142, 0145 PCIe switch
0130, 0140 Drive chassis
0120, 0133, 0143 PCIe SSD
0200 Root complex
0202 Virtual PCIe bus
0203, 0204, 0205, 0206 Virtual P2P bridge
0207, 0208, 0209, 0210 Root port
0211, 0212, 0213, 0214 Link
1240 Switch embedded flash memory device
1433, 1437 SAS host bus adaptor (SAS HBA)
1442, 1445 SAS Expander

The invention claimed is:

1. An information system, comprising:
a basic chassis which includes a memory and a processor;
a plurality of expansion chassis;
a plurality of external devices;
a plurality of first buses which start from the basic chassis and which sequentially connect the plurality of the expansion chassis in series as a plurality of stages; and
a plurality of second buses which connect ones of the expansion chassis with ones of the external devices,
wherein PCI-Express is a mutual communication interface of each of the basic chassis, the plurality of the expansion chassis, and the external devices,
wherein the memory stores instructions, that when executed by the processor, cause the processor to manage a plurality of allocatable bus numbers from a minimum value to a maximum value that are available for the first buses and the second buses, and
wherein the memory further stores instructions, that when executed by the processor, cause the processor to apply the bus numbers to the first buses starting from the minimum value for the basic chassis and that are each sequentially incremented by a fixed value of one or more from the minimum value towards a last stage of the plural stages, and to apply the bus numbers to the second buses starting from the maximum value for a first stage of the plural stages and that are each sequentially decremented by the fixed value of one or more from the maximum value towards the last stage of the plural stages.

2. The information system according to claim 1,
wherein the external devices are a plurality of drives,
wherein the basic chassis has a first port that is connected to the first stage by one of the first buses,
wherein each of the plurality of the expansion chassis is configured to have a respective second port that is connected to another of the plurality of the expansion chassis as a next stage by the first buses, and one or more respective third ports each connected to ones of the drives by the second buses, and
wherein, when the expansion chassis which is the first stage is connected to the first port via the first buses, and one of the drives is connected to the one of the respective third ports of the expansion chassis which is the first stage via the second bus, the memory further stores instructions, that when executed by the processor, cause the processor to apply the bus numbers with respect to the first buses and the second buses.

3. The information system according to claim 2,
wherein the memory further stores a bus number management table for managing the bus numbers, and
wherein the memory further stores instructions, that when executed by the processor, cause the processor to register the applied bus numbers to the bus number management table.

4. The information system according to claim 3,
wherein the memory further stores instructions, that when executed by the processor, cause the processor to reserve and register one or more bus numbers that are unapplied but are scheduled to be allocated, within a range of the bus numbers allocated to the second buses in the bus number management table.

5. The information system according to claim 3, further comprising:
a management terminal connected to the basic chassis which displays an allocation status of the bus numbers of the bus number management table, and notifies an insufficiency of the allocatable bus numbers.

6. A bus number allocation method in an information system, comprising:
providing a basic chassis that is connected to a plurality of expansion chassis by a plurality of first buses which start from the basic chassis and which sequentially connect the plurality of the expansion chassis in series as a plurality of stages;
providing a plurality of external drives that are connected to the plurality of expansion chassis by a plurality of second buses which connect ones of the expansion chassis with ones of the external drives;
managing a plurality of allocatable bus numbers from a minimum value to a maximum value that are available for the first buses and the second buses;
applying the bus numbers to the first buses starting from the minimum value for the basic chassis and which are each sequentially incremented by a fixed value of one or more from the minimum value towards a last stage of the plural stages, and applying the bus numbers to the second buses starting from the maximum value for a first stage of the plural stages and that are each sequentially decremented by the fixed value of one or more from the maximum value towards the last stage of the plural stages,
wherein PCI-Express is a mutual communication interface of each of the basic chassis, the plurality of the expansion chassis, and the drives.

7. An information system, comprising:
a basic chassis which includes a memory and a processor;
a plurality of expansion chassis;
a plurality of external devices;
a plurality of first buses which start from the basic chassis and which sequentially connect the plurality of the expansion chassis in series as a plurality of stages; and
a plurality of second buses which connect ones of the expansion chassis with ones of the external devices, wherein PCI-Express is a mutual communication interface of each of the basic chassis, the plurality of the expansion chassis, and the external devices, wherein the memory stores instructions, that when executed by the processor, cause the processor to manage a plurality of allocatable bus numbers from a minimum value to a maximum value that are available for the first buses and the second buses, and wherein the memory further stores instructions, that when executed by the processor, cause the processor to apply the bus numbers to the first buses starting from the maximum value for the basic chassis and that are each sequentially decremented by a fixed value of one or more from the maximum value towards a last stage of the plural stages, and to apply the bus numbers to the second buses starting from the minimum value for a first stage of the plural stages and that are each sequentially incremented by the fixed value of one or more from the minimum value towards the last stage of the plural stages.

8. The information system according to claim 7, wherein the external devices are a plurality of drives, wherein the basic chassis has a first port that is connected to the first stage by one of the first buses, wherein each of the plurality of the expansion chassis is configured to have a respective second port that is connected to another of the plurality of the expansion chassis as a next stage by the first buses, and one or more respective third ports each connected to ones of the drives by the second buses, and wherein, when the expansion chassis which is the first stage is connected to the first port via the first buses, and one of the drives is connected to the one of the respective third ports of the expansion chassis which is the first stage via the second bus, the memory further stores instructions, that when executed by the processor, cause the processor to apply the bus numbers with respect to the first buses and the second buses.

9. The information system according to claim 8, wherein the memory further stores a bus number management table for managing the bus numbers, and wherein the memory further stores instructions, that when executed by the processor, cause the processor to register the applied bus numbers to the bus number management table.

10. The information system according to claim 9, wherein the memory further stores instructions, that when executed by the processor, cause the processor to reserve and register one or more bus numbers that are unapplied but are scheduled to be allocated, within a range of the bus numbers allocated to the second buses in the bus number management table.

11. The information system according to claim 9, further comprising:

a management terminal connected to the basic chassis which displays an allocation status of the bus numbers of the bus number management table, and notifies an insufficiency of the allocatable bus numbers.

12. A bus number allocation method in an information system, comprising:

providing a basic chassis that is connected to a plurality of expansion chassis by a plurality of first buses which start from the basic chassis and which sequentially connect the plurality of the expansion chassis in series as a plurality of stages;

providing a plurality of external drives that are connected to the plurality of expansion chassis by a plurality of second buses which connect ones of the expansion chassis with ones of the external drives;

managing a plurality of allocatable bus numbers from a minimum value to a maximum value that are available for the first buses and the second buses;

applying the bus numbers to the first buses starting from the maximum value for the basic chassis and which are each sequentially decremented by a fixed value of one or more from the maximum value towards a last stage of the plural stages, and applying the bus numbers to the second buses starting from the minimum value for a first stage of the plural stages and that are each sequentially incremented by the fixed value of one or more from the minimum value towards the last stage of the plural stages, wherein PCI-Express is a mutual communication interface of each of the basic chassis, the plurality of the expansion chassis, and the drives.

* * * * *